US012769444B2

(12) United States Patent
Mizushima

(10) Patent No.: US 12,769,444 B2
(45) Date of Patent: Oct. 20, 2026

(54) STORAGE SYSTEM

(71) Applicant: Hitachi Vantara, Ltd., Yokohama (JP)

(72) Inventor: Nagamasa Mizushima, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 92 days.

(21) Appl. No.: 18/830,949

(22) Filed: Sep. 11, 2024

(65) Prior Publication Data

US 2025/0291482 A1 Sep. 18, 2025

(30) Foreign Application Priority Data

Mar. 13, 2024 (JP) ................................ 2024-038985

(51) Int. Cl.
*G06F 3/06* (2006.01)

(52) U.S. Cl.
CPC .......... *G06F 3/0608* (2013.01); *G06F 3/0655* (2013.01); *G06F 3/0679* (2013.01)

(58) Field of Classification Search
CPC .... G06F 3/0608; G06F 3/0655; G06F 3/0679; G06F 3/061; G06F 3/0626; G06F 3/0638; G06F 3/0658; G06F 16/172; G06F 16/1744
See application file for complete search history.

(56) References Cited

U.S. PATENT DOCUMENTS 5,392,036 A 2/1995 Klein
11,068,405 B2 * 7/2021 Armangau ............ G06F 3/0673
2006/0085737 A1 * 4/2006 Liu ......................... H03M 7/30 715/234
2020/0249877 A1 * 8/2020 McIlroy .............. G06F 16/1744
2022/0188030 A1 * 6/2022 Mizushima ........... G06F 3/0659
2023/0236766 A1 7/2023 Mizushima et al.
2024/0192869 A1 * 6/2024 Natu ..................... G06F 9/5016

FOREIGN PATENT DOCUMENTS

JP 2022-095015 A 6/2022

OTHER PUBLICATIONS

Japanese Office Action issued on Jan. 27, 2026 for Japanese Patent Application No. 2024038985.

* cited by examiner

*Primary Examiner* — Hosain T Alam
*Assistant Examiner* — Alan Otto
(74) *Attorney, Agent, or Firm* — Volpe Koenig

(57) ABSTRACT

The controller performs in-line compression of plaintext data from a host and post-process compression of in-line compressed data stored in one or more storage drives. In the in-line compression, in-line compressed data is generated by executing a compression process including first dictionary compression on the plaintext data from the host, and the in-line compressed data is stored in the one or more storage drives. In the post-process compression, the plaintext data is generated by decompressing the in-line compressed data read from the one or more storage drives. In the post-process compression, post-process compressed data is generated by executing a compression process including second dictionary compression on the plaintext data using the processor, the second dictionary compression being more excellent in character string search capability than the first dictionary compression, and the post-process compressed data is stored in the one or more storage drives.

15 Claims, 17 Drawing Sheets

230

| | ENTRY 1 | | ENTRY 2 | | ENTRY 3 | |
|---|---|---|---|---|---|---|
| HASH VALUE | POSITION | CHARACTER STRING | POSITION | CHARACTER STRING | POSITION | CHARACTER STRING |
| 000 | 3 | def | 18 | def | | |
| 001 | 9 | dea | 11 | aba | 13 | aba |
| 010 | 2 | cde | 8 | cde | 17 | cde |
| 011 | 0 | abc | 15 | abc | | |
| 100 | 4 | efe | 19 | efe | | |
| 101 | 1 | bcd | 7 | bcd | 16 | bcd |
| 110 | 5 | feb | 10 | eab | 20 | feb |
| 111 | 6 | ebc | 12 | bab | 14 | bab |

STORAGE SYSTEM

CLAIM OF PRIORITY

The present application claims priority from Japanese patent application JP 2024-038985 filed on Mar. 13, 2024, the content of which is hereby incorporated by reference into this application.

BACKGROUND OF THE INVENTION

1. Field of the Invention

The present invention relates to a data compression technology in a storage system.

2. Description of the Related Art

A storage system, which is an information device for accumulating and managing a large amount of data, can reduce the cost per capacity by storing more data. Therefore, the storage system has a function of compressing written data and then storing the compressed data in a disk drive.

For example, in recent years, in addition to or instead of a hard disk drive (HDD), a solid state drive (SSD) equipped with a NAND flash memory, which is a nonvolatile semiconductor memory, has been adopted as a storage medium of a storage system. Since the SSD does not have a physical head seek mechanism such as the HDD in data access, the SSD has little cueing delay (latency) and has excellent response performance in reading random data.

For this reason, in applications such as databases that require high-speed random reading, HDDs are being replaced with SSDs as storage media in storage systems. Although the bit cost of SSDs has been decreasing year by year due to the high integration of flash memory cells, it still remains higher than the bit cost of HDDS.

Therefore, many storage systems using SSDs as storage media incorporate a reversible compression technology to reduce the size of data stored on the SSDs. As a result, the storage capacity of the system can be made virtually large, and the cost per capacity can be reduced to be close to that of the storage system using the HDD as a storage medium.

The background art of the present disclosure includes JP 2022-095015 A. JP 2022-095015 A discloses a storage system using an LZMA algorithm. In an LZMA compression process, plaintext data before compression is first subjected to a dictionary compression process. Thereafter, a dictionary compression result is subjected to a range encoding process. As a result, LZMA compressed data is generated. In an LZMA decompression process, the compressed data is first subjected to a range decoding process. Thereafter, a decoding result is subjected to a plaintext decompression process. As a result, original plaintext data is generated. In JP 2022-095015 A, LZMA range encoding is configured by a plurality of ranges to process range encoders/decoders in parallel, thereby speeding up in-line compression and decompression.

SUMMARY OF THE INVENTION

In-line compression for compressing data received from a host and storing the compressed data in a storage drive is required to satisfy an IO performance requirement of a storage system together with a high compression rate. Data compression using a hardware circuit (accelerator) can meet a higher IO performance requirement because it enables faster data compression. On the other hand, the design of the storage system imposes limitations on the logic scale of the field programmable gate array (FPGA) of the accelerator.

Therefore, there is a demand for a technology capable of improving a compression rate of data to be stored while satisfying an IO performance requirement of a storage system and a limitation on a circuit scale for data compression.

A storage system according to an aspect of the present invention includes a controller including a processor and a data compression/decompression circuit, in which the controller performs in-line compression of plaintext data from a host and post-process compression of in-line compressed data stored in one or more storage drives, the in-line compression includes: generating in-line compressed data by executing a compression process including first dictionary compression on the plaintext data from the host using the data compression/decompression circuit; and storing the in-line compressed data in the one or more storage drives, and the post-process compression includes: generating the plaintext data by decompressing the in-line compressed data read from the one or more storage drives using the data compression/decompression circuit; and generating post-process compressed data by executing a compression process including second dictionary compression on the plaintext data using the processor, the second dictionary compression being more excellent in character string search capability than the first dictionary compression, and storing the post-process compressed data in the one or more storage drives.

According to an aspect of the present invention, it is possible to more effectively compress storage data of the storage system.

DESCRIPTION OF THE PREFERRED EMBODIMENTS

In the following description, if necessary for convenience, the description will be divided into a plurality of sections or embodiments, but unless otherwise specified, the sections or embodiments are not unrelated to each other, and one of the sections or embodiments is a partial or entire modification, detail, supplementary explanation, or the like of another one of the sections or embodiments. Furthermore, when the number of elements and the like (including number, numerical value, amount, range, and the like) are mentioned below, the number of elements is not limited to a specific number unless otherwise stated or unless obviously limited to the specific number in principle, and the number of elements may be greater than or smaller than the specific number.

In an embodiment of the present specification, data written to a storage system is compressed in an in-line process by an accelerator (logic circuit), and the compressed data is written to a storage drive. Further, the in-line compressed data written to the storage drive is returned to plaintext in a post process, the plaintext is re-compressed by a compression method in which dictionary compression is enhanced as compared to that performed by the accelerator, and the re-compressed data is written back to the storage drive. As a result, the data compression rate of the storage system can be improved (stored data can be further reduced) without increasing the circuit scale of the accelerator.

LZMA compression can improve the compression rate by increasing the search capability of dictionary compression. However, the LZMA a compression using hardware circuit (accelerator) increases a logic scale of a field programmable gate array (FPGA) by increasing the search capability of dictionary compression. In addition, dictionary compression by software in in-line compression may cause a decrease in IO performance.

From the viewpoint of the IO performance requirement of the storage system and the logic scale of the FPGA of the accelerator, it is difficult to enhance the dictionary compression to improve the in-line compression rate. Therefore, there is a demand for a technology capable of improving a compression rate of data to be stored while satisfying an IO performance requirement of a storage system and a limitation on a circuit scale for data compression.

First Embodiment (1) System Configuration

Hereinafter, a storage system having a data compression function will be described as an embodiment of the present specification. The storage system reduces the amount of stored data by reversible compression.

Figure 1:
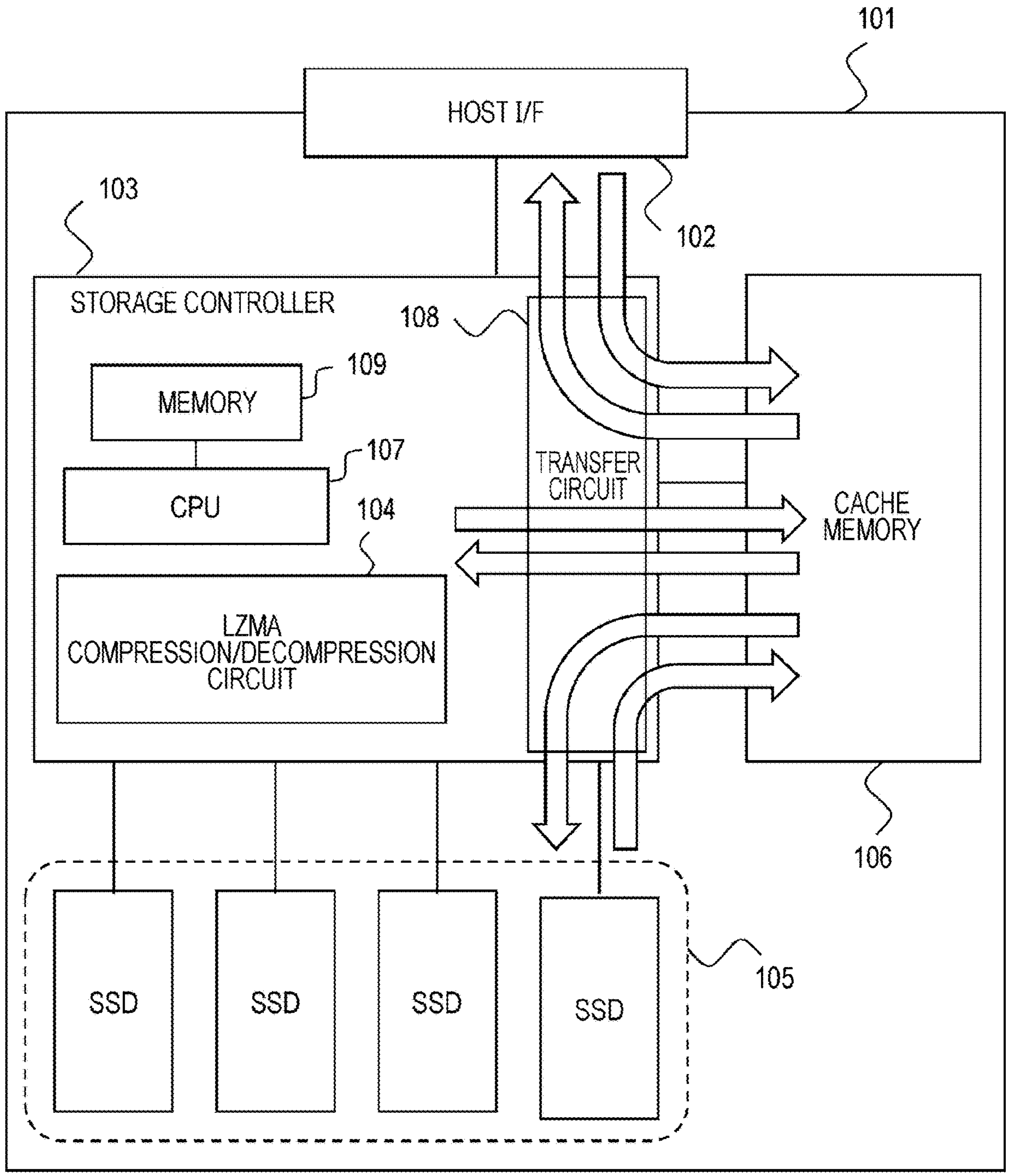
FIG. 1 illustrates a configuration example of a storage system.

FIG. 1 illustrates a configuration example of a storage system according to an embodiment of the present specification. A storage system 101 includes a host interface (I/F) 102, a storage controller 103, a plurality of solid state drives (SSDs) 105, and a cache memory 106 using a volatile memory such as a dynamic random access memory (DRAM).

The storage controller 103 is connected to the host I/F 102, the SSDs 105, and the cache memory 106, and includes a CPU 107, which is a processor for controlling them, and a memory 109. The CPU 107 can include one or more cores, and operates as a predetermined functional unit by executing a program (software) stored in the memory 109.

The memory 109 stores system software including an operating system necessary for operating a program on the storage controller 103, a program operating on the processor 107, metadata used by the program, and data required to be temporarily stored. Note that only one of the memory 109 and the cache memory 106 may be mounted, and may also store data of the other one of the memory 109 and the cache memory 106.

The CPU 107 interprets a content of a read/write commend from/into a host (not illustrated), transmits/receives data to/from the host, compresses/decompresses data by the LZMA compression/decompression circuit 104, a data which is compression/decompression circuit, and transfers data to/from the SSD 105 or the cache memory 106. The CPU 107 further executes post-process compression of data stored in the SSD 105.

The host I/F 102 is an interface mechanism for connecting to an external host, and responds to a read/write command in order to transmit data to the host or receive data from the host. A mechanism and a protocol for transmitting and receiving commands and data of the host I/F 102 conform to, for example, a standard interface standard.

The storage controller 103 includes an LZMA compression/decompression circuit 104 and a transfer circuit 108. The transfer circuit 108 receives and transmits data compressed or decompressed by the LZMA compression/decompression circuit 104. The transfer circuit 108 transfers data between components of the storage system 101, example, for between the LZMA compression/decompression circuit 104 and the cache memory 106, and between the CPU 107 and the cache memory 106. In addition, the transfer circuit 108 transfers data between the host I/F 102 and the cache memory 106 and between the SSD 105 and the cache memory 106.

In order to reduce the amount of data stored in the SSD 105, which is a storage drive, the LZMA compression/decompression circuit 104 generates compressed data by reversibly compressing write data received in response to a write command. Further, in order to transmit original plaintext data to the host in response to a read command, compressed data read from the SSD 105 is decompressed to generate plaintext data.

The storage controller 103 executes in-line compression and post-process compression. In the in-line compression, write data from the host is compressed and stored in the SSD 105. In the post-process compression, the compressed data is read from the SSD 105, and the decompressed data is recompressed and the recompressed data is returned to the SSD 105.

In the in-line compression, the write data from the host is first temporarily stored in the cache memory 106. At this point, the storage controller 103 returns write completion to the host. Thereafter, the write data is converted into compressed data through the LZMA compression/decompression circuit 104, and the compressed data is also temporarily stored in the cache memory 106. Then, the compressed data is written to the SSD 105. As will be described below, the LZMA compression/decompression circuit 104 executes dictionary compression and range encoding.

In the post-process compression, the compressed data is read from the SSD 105 and stored in the cache memory 106. Next, in the post-process compression, the compressed data is decompressed back into plaintext by the LZMA compression/decompression circuit 104. Thereafter, in the post-process compression, the CPU 107 compresses the data again by executing dictionary compression in which character string search capability is enhanced as compared with that of the LZMA compression/decompression circuit 104, and range encoding. The compressed data is temporarily stored in the cache memory 106 and then written to the SSD 105.

Read data to the host is read from the SSD 105 in a compressed state, and first temporarily stored in the cache memory 106. Thereafter, the compressed data is converted into plaintext data through the LZMA compression/decompression circuit 104, and the plaintext data is also temporarily stored in the cache memory 106. Then, the plaintext data is transmitted to the host.

The LZMA compression/decompression circuit 104 is implemented, for example, as hardware (logic circuit) designed based on a data compression/decompression scheme according to an embodiment of the present specification, which is different from a processor operated by software. For example, an accelerator using an FPGA may be used. Since the LZMA compression/decompression circuit 104 has high-speed data decompression performance, the storage system 101 can utilize high-speed random read performance, which is a feature of the SSD, not only for uncompressed data but also for compressed data.

A storage drive of a type different from the SSD, for example, a hard disk drive (HDD), may be used. The storage drive is not mounted in the housing of the storage system 101, and may be connected to the storage controller 103 or the cache memory 106 via a network, and the storage area of the storage drive may exist on the cloud.

(2) LZMA Algorithm

The LZMA algorithm will be described with reference to FIGS. 2A to 5B as prerequisite knowledge for explaining a data decompression scheme according to an embodiment of the present specification.

(2-1) Overview of LZMA Algorithm

Figure 2A:
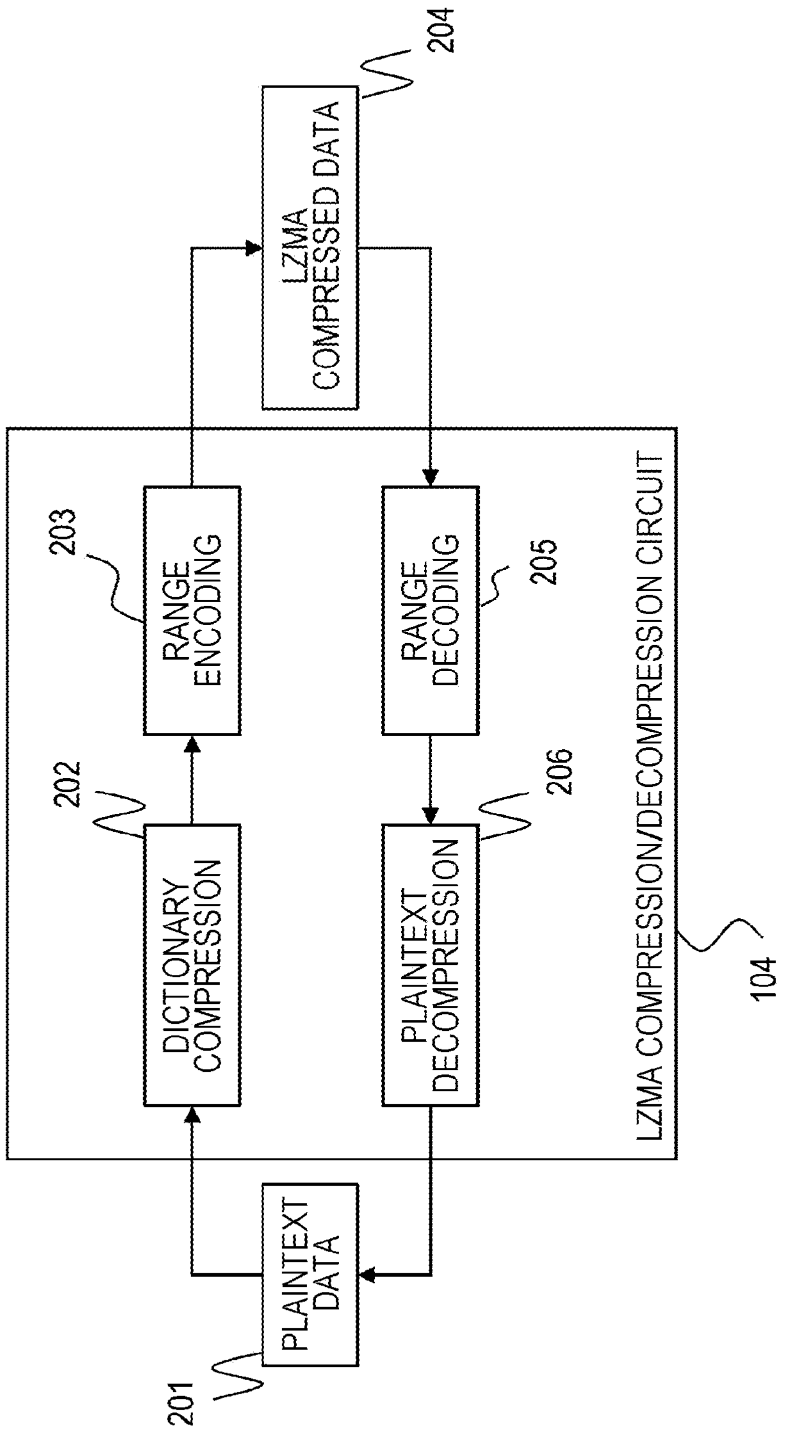
FIG. 2A illustrates an outline of an LZMA algorithm.

FIG. 2A illustrates an overview of an LZMA algorithm. In an LZMA compression process, plaintext data 201 before compression is first subjected to dictionary compression 202. A dictionary compression result is then subjected to range encoding 203. As a result, LZMA compressed data 204 is generated.

On the other hand, in an LZMA decompression process, the compressed data 204 is first subjected to a range decoding process 205. Thereafter, a decoding result is subjected to a plaintext decompression process 206. As a result, original plaintext data 201 is generated.

(2-2) Dictionary Compression Process

Figures 2B, 2C:
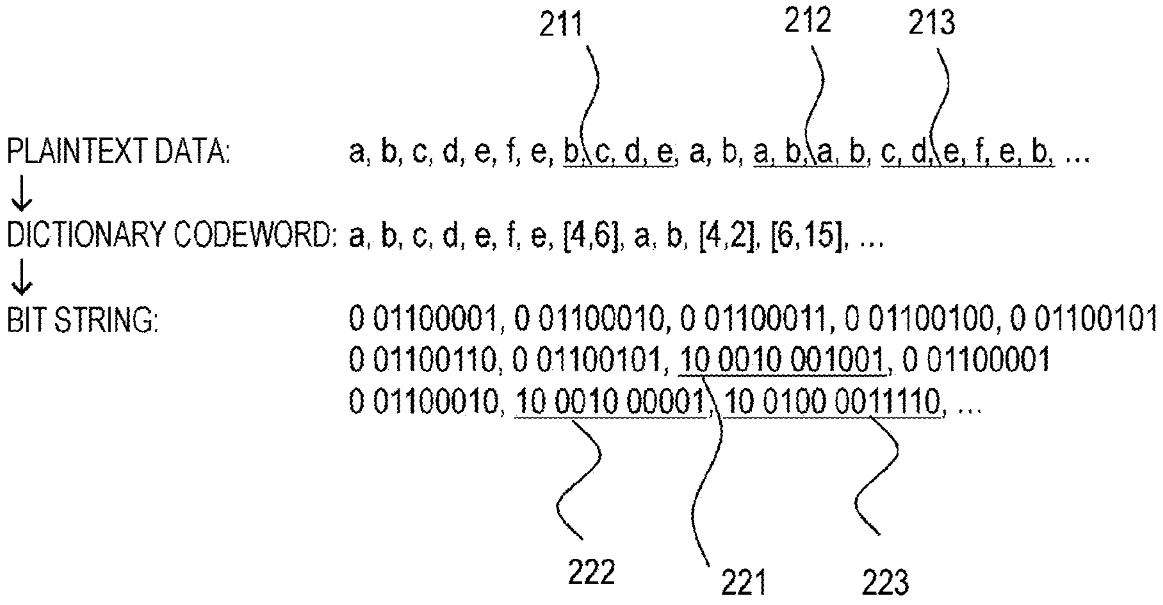
FIG. 2B illustrates a specific example of a dictionary compression process.
FIG. 2C illustrates a configuration example of a hash table.

FIG. 2B illustrates a specific example of the dictionary compression 202 constituting the LZMA algorithm. In a character string stream of the plaintext data 201, it is sequentially checked whether the same character string appears again. When a certain character string matches L characters that are consecutive from J characters back with respect to its foremost character as a starting point, this character string is converted into a copy symbol [L, J].

For example, a character string 211 of four characters "b, c, d, e" matches four characters that are consecutive from six characters back with respect to its foremost character "b" as a starting point. In this case, the character string 211 is converted into a copy symbol [4, 6]. Similarly, a character string 212 of four characters "a, b, a, b" matches four characters that are consecutive (including overlapping portions) from two characters back with respect to its foremost character "a" as a starting point. In this case, the character string 212 is converted into a copy symbol [4,2].

Similarly, a character string 213 of six characters "c, d, e, f, e, b" matches six characters that are consecutive from 15 characters back with respect to its foremost character "c" as a starting point. In this case, the character string 213 is converted into a copy symbol [6, 15]. Since the amount of data contained in these copy symbols is smaller than the amount of data contained in the original character string, the amount of data can be reduced by this conversion.

A range of a character string stream (hereinafter referred to as a dictionary) referred to in the matching search is a range from one character back to a predetermined number of characters back. Since the dictionary range slides backward every time a search is performed, this compression technology is also called sliding dictionary compression. When a plurality of matching character strings are present in the dictionary range, a string including a largest number of consecutive matching characters is converted into a copy symbol. This can further reduce the amount of data.

In order to generate data to be input to range encoding 203 in a subsequent stage, it is necessary to encode characters that have not been converted into copy symbols (hereinafter referred to as literal characters) and the copy symbols in prescribed bit patterns, and concatenate the bit patterns into a bit stream.

FIG. 2B illustrates a bitstream as an encoding result according to the rules of the LZMA specification. This bit stream is input to the range encoding 203. For example, the bit pattern 221 has a 12-bit length, which represents the copy symbol [4, 6]. The bit pattern 222 has a 11-bit length, which represents the copy symbol [4,2]. The bit pattern 223 has a 13-bit length, which represents the copy symbol [6, 15]. In this manner, the length of the bit pattern corresponding to the copy symbol is not fixed. On the other hand, the literal character is represented by a bit pattern having a 9-bit length in which one bit of 0 is added to the beginning of the 8-bit value of the character.

In the range decoding process 205, such a bit stream is output to the LZMA decompression process. In the plaintext decompression process 206, when such a bit stream is input, the bit stream is interpreted as copy symbols or literal characters, and a character string stream of the plaintext data 201 is restored.

FIG. 2C illustrates a configuration example of a hash table 230 for the LZMA compression/decompression circuit 104 to search for a matching character string in the dictionary compression 202. The hash table 230 indicates a character string of three characters from which each hash value is obtained and a position of the character string in input data. In the example illustrated in FIG. 2C, each hash value is represented by three bits, and the character string is three consecutive characters. The upper limit of the number of entries for each hash value is three.

Hereinafter, a processing procedure of the dictionary compression 202 will be described. The plaintext data, which is input data, has the following configuration as illustrated in FIG. 2B "a, b, c, d, e, f, e, b, c, d, e, a, b, a, b, a, b, c, d, e, f, e, b, . . . ". The LZMA compression/decompression circuit 104 performs the following processes in order from the head position of the input data.

(1) First, the LZMA compression/decompression circuit 104 calculates a hash value X (3 bits) of three characters from a current position, and registers the current position and the three characters in the hash table 230. Note that, due to the nature of the hash function, the same hash value can be calculated from completely non-matching character strings.

(2) Next, if the number of registered entries of the hash value X exceeds three, the LZMA compression/decompression circuit 104 discards the oldest entry (the entry having the smallest value indicating the position). Since information about a character string that frequently appears is frequently registered in entries, entries having the same character string are hit with a high probability in the process of step (3) below. On the other hand, since a character string that appear infrequently has a low priority in terms of compression efficiency obtained by conversion into a copy code, the hash table can be efficiently used by preferentially eliminating such a character string from the entry.

(3) Next, the LZMA compression/decompression circuit 104 checks there is an entry storing a character string matching the newly registered current character string, referring to other entries related to the hash value X. When the same character string is stored in one or more entries for the hash value X, a character string having the shortest distance to the current character string is selected. This selection operation is understood as follows, for example, assuming that abc is given again as the current character string in FIG. 2C. The new current character string abc is registered in entry 3, and entry 2 having a character string matching the current character string is specified. On the other hand, when there is no character string matching the current character string in the corresponding entry even if the hash value X is obtained, the process proceeds to step (7).

(4) Next, since there is a possibility that four or more characters match, the LZMA compression/decompression circuit 104 directly reads the input data and checks the longest matching length L. That is, the current character string has a matching character string in an entry associated with the corresponding hash value X, and a matching range is also examined for subsequent characters following the character string. As a result, the same character string (three or more characters) having the character string stored in the entry as a head is specified at two positions, and the length of the specified character string is calculated as the longest matching length L.

(5) Next, the LZMA compression/decompression circuit 104 determines a distance D from the current position (the position of the current character string) to the head of the found matching character string (equal to a difference between the positions stored in the two compared entries).

(6) Next, the LZMA compression/decompression circuit 104 converts the character string having the length L from the current position into a copy code (L, D), and proceeds to step (8).

(7) When there is no character string matching the current character string in step (3), the LZMA compression/decompression circuit 104 converts one character at the current position into a literal code.

(8) After step (6), the LZMA compression/decompression circuit 104 ends the process when the end of the data has been reached. Otherwise, the LZMA compression/decompression circuit 104 returns to step (3).

The dictionary code of the plaintext data is as follows "a, b, c, d, e, f, e, (4, 6), a, b, (4, 2), (6, 15), . . . "

As described above, by using the hash table 230, it is possible to efficiently find a character string including three matching characters. Thereafter, by checking a character string including four or more matching characters, a matching character string including more characters can be found.

In general, as the number of bits of the hash value (the number of rows of the hash table 230) is larger, and as the upper limit of the number of entries (the number of columns of the hash table 230) is larger, the number of character strings registered in the hash table 230 increases by a power of 2, improving the probability of finding a matching character string. That is, the compression rate of dictionary compression is improved. However, in order to improve the compression rate, a large-capacity table memory is required, and the circuit scale of the LZMA compression/decompression circuit 104 increases. Also, the probability of finding a matching character string can be improved by reducing the number of characters in the character string. However, the time required for searching for a matching character string in plaintext data increases. Note that it is also possible to improve the probability of finding a matching character string by increasing the number of entries allowed for the hash value. That is, by lengthening the period during which the character string and its position are held in the entry, the probability of finding a matching character string is improved even if the matching character string appears at a low frequency. However, the adoption of this method also increases the time required for searching for a matching character string.

(2-3) Range Encoding/Decoding Process

Figure 3A:
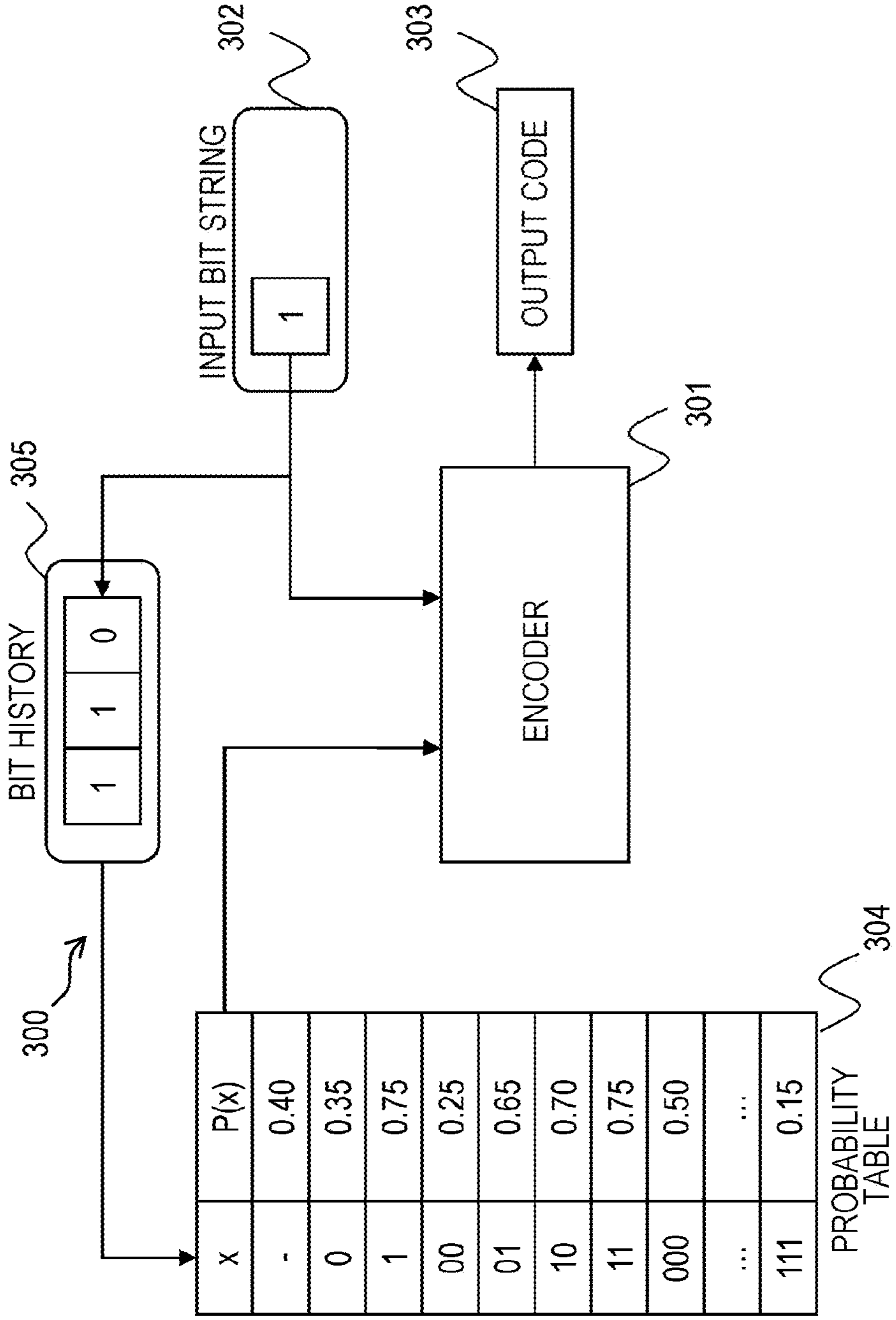
FIG. 3A illustrates a functional block diagram of range encoding.
Figure 3B:
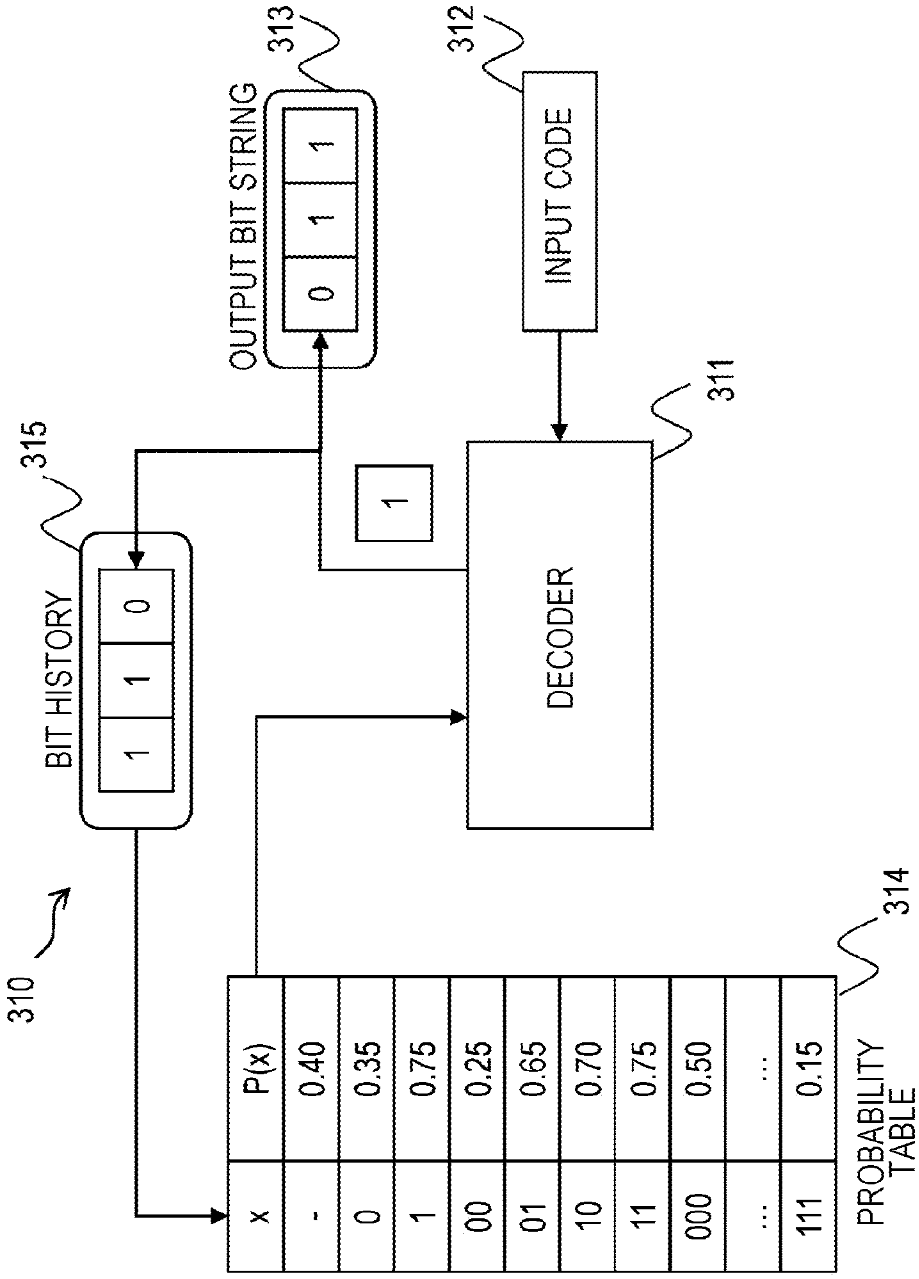
FIG. 3B illustrates a functional block diagram of range decoding.

FIG. 3A illustrates a functional block diagram for range encoding, and FIG. 3B illustrates a functional block diagram for range decoding. A range encoding function 300 will be described with reference to FIG. 3A. An encoder 301 is an arithmetic block that receives an input from an input bit string 302 in units of one bit and generates an output code 303. In the example of FIG. 3A, the input bit string is "1, 1, 0, 1" and corresponds to a part of the bit string illustrated in FIG. 2B. A method for generating the output code 303 will be described in the next section with reference to FIGS. 4A and 4B. The output code 303 corresponds to compressed data of the LZMA algorithm (the LZMA compressed data 204 in FIG. 2A).

The encoder 301 also uses a probability value quoted from a probability table 304 as an input. The probability value P(x) indicates a probability that the next input bit from the input bit string 302 is "0" when a bit history 305 input so far is x. Note that, in FIG. 3A, in order to simplify the description, a general notation of probability using a decimal point is adopted, but in implementation, a sufficiently large range of integers is given, and the range is divided by integer widths (sections) corresponding to the probabilities. In addition, in a case where the range of integers is too small to be suitable for further division, the number of digits is increased at that stage so that division can be performed again, thereby avoiding problems with floating points and the like. Furthermore, the probability value P(x) may indicate a probability that the next input bit from the input bit string 302 is "1" when the bit history 305 input so far is x.

The encoder 301 performs adaptation by learning each time the probability value P(x) is used. For example, P(x) is increased when the next input bit is actually "0", and P(x) is decreased when the next input bit is "1". Note that, at the time when the encoding is started, all unused P(x) values are 0.5 (probabilities of "0" and "1" are equal).

For example, in FIG. 3A, in a situation in which a first bit is given, x="–" at this point. The probability that the first bit is "0" is 0.4, and the probability that the first bit is "1" is 0.6. Note that, in a case where a bit string is given immediately after the encoder is completely initialized, P(–)=0.5 (initial value). However, in FIG. 3A, the result P "–" to which the learning of the bit history is applied is different from the initial value.

In the case of x=0 when the first bit is "0", the probability that the second bit becomes "0" is 0.35, and the probability that the second bit becomes "1" is 0.65. In this case as well, when the second bit is "0", the probability of P(x=0) is increased, and when the second bit is "1", the probability of P(x=0) is decreased. The updates of these probabilities are learned through the entire target bit history (bit stream). Note that a compression mechanism achieved by applying the probability table 304 obtained in this manner to the bit history 305 will be described with reference to FIG. 4A.

Next, a range decoding function 310 will be described with reference to FIG. 3B. A decoder 311 is an arithmetic block that receives an input code 312 (that is, the output code 303) and generates an output bit string 313 in units of one bit. A method for generating the output bit string 313 will be described in the next section with reference to FIGS. 4A and 4B. The output bit string 313 corresponds to a bit stream input to a plaintext decompression process (the plaintext decompression process 206 in FIG. 2) of the LZMA algorithm, that is, a bit stream output from the dictionary compression 202 in FIG. 2.

The decoder 311 also uses a probability value quoted from a probability table 314 as an input. The probability value P(x) indicates a probability that the next output bit is "0" when a bit history 315 output so far is x.

Like the encoder 301, the decoder 311 performs adaptation by learning each time the probability value P(x) is used. For example, P(x) is increased when the next output bit is actually "0", and P(x) is decreased when the next output bit is "1". Note that, at the time when the decoding is started, all unused P(x) values are 0.5 (probabilities of "0" and "1" are equal).

When the output code 303 of the range encoding function 300 and the input code 312 of the range decoding function 310 are the same, the changes by learning of all the probability values P(x) between the probability table 304 and the probability table 314 are the same. Therefore, a change that occurs during encoding is reproduced during decoding.

(2-4) Principle of Range Encoding/Decoding

Figure 4A:
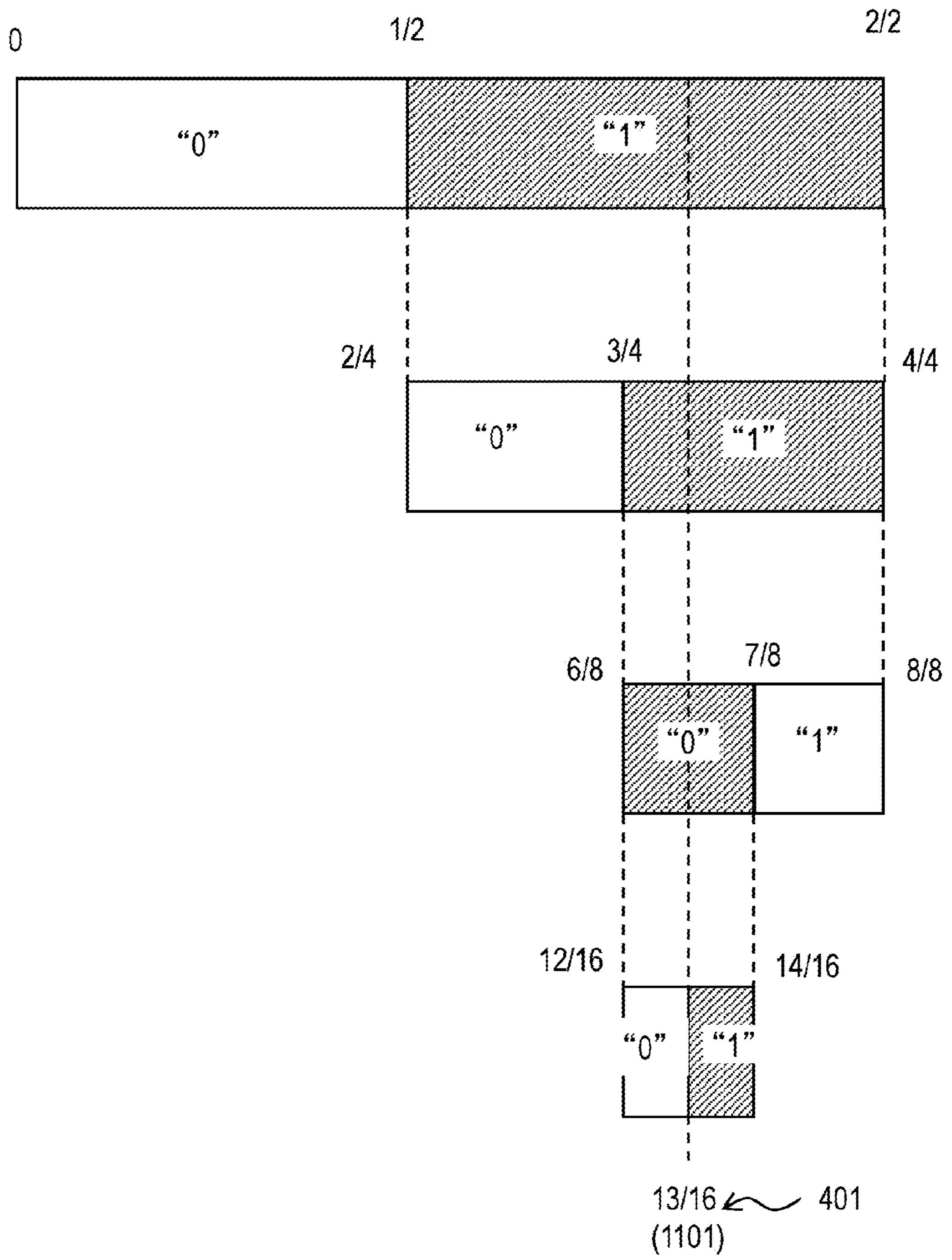
FIG. 4A illustrates an example for explaining the principle of range encoding.
Figure 4B:
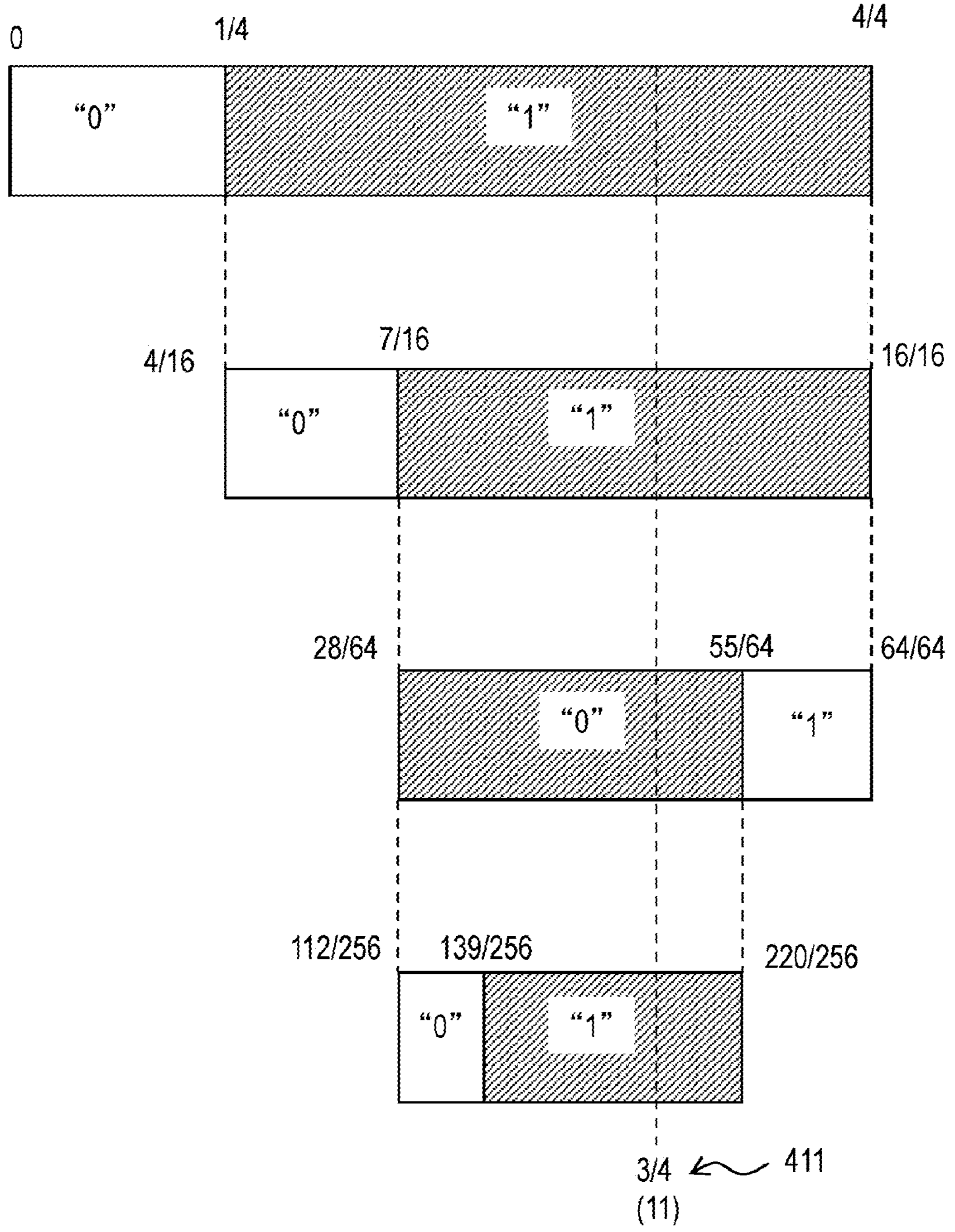
FIG. 4B illustrates another example for explaining the principle of range encoding.

FIGS. 4A and 4B illustrate examples for explaining the principle of range encoding/decoding. In the encoding process performed by the encoder 301 in FIG. 3A, it is repeated to divide the numerical axis of [0,1) by a length according to the probability that each bit value of the input bit string is "0", and leave one of the sections as a division target for the next bit. In the encoding process, a coordinate value included in a finally-left section is output as a code. When the bit is "0", the divided left section is left, and when the bit is "1", the divided right section is left. In addition, the probability that each bit value is "O" is acquired from the probability table 304 using the input bit history up to that time as an index.

According to the definition of the LZMA algorithm, a bit history for referring to a probability value is cleared under a predetermined condition. For example, for 9 bits representing a literal character, the encoder 301 encodes the first bit among 8 bits excluding the header 1 bit, using a NULL bit history. The encoder 301 encodes the last eighth bit using the first to seventh bits as a bit history, and then clears the bit history.

As illustrated in FIGS. 4A and 4B, in the decoding process performed by the decoder 311 in FIG. 3B, the numerical axis of [0,1) is divided by a length according to the probability that each bit value of the output bit string is "0". Furthermore, the decoder 311 repeats checking which section the input code (coordinate value) is included in, determining each bit of the output bit string, and leaving the section in which the input code is included as a division target for the next bit. Then, all the values of the output bit string are finally determined.

Note that, when the numerical axis is divided, in a case where the code is included in the left section, the decoder 311 determines that the bit is "0", and in a case where the code is included in the right section, the decoder 311 determines that the bit is "1". In addition, the probability that each bit value is "0" is acquired from the probability table 314 using the output bit history up to that time as an index.

The decoder 311 clears the bit history for referring to the probability values under the same condition as that for encoding. For example, for 9 bits representing a literal character, the decoder 311 decodes the first bit among the 8 bits excluding the header 1 bit, using a NULL bit history. The decoder 311 decodes the last eighth bit using the first to seventh bits as a bit history, and then clears the bit history.

Each of FIGS. 4A and 4B illustrates an example of transition of the division of the numerical axis in the process of encoding/decoding a bit string "1101". However, the value of the probability that the bit value is "0" is different. In the example of FIG. 4A, the probability value of "0" is always 0.5. In the example of FIG. 4B, the probability values of "0" are 0.25, 0.25, 0.75, and 0.25 in bit order, respectively. FIG. 4A illustrates a case where the probability values referred to from the probability tables 304 and 314 are in the initial state.

Therefore, if the probability table 304 has already been learned, the section is divided according to the probability stored in the learned probability table 304. Further, when the bit string "1101" is input, in FIG. 4A, the section of "1" is larger than the section of "0" in the first, second, and fourth columns, and the section of "0" is larger than the section of "1" in the third column. Then, the size of the section of "0" in each row (a value serving as a boundary with "1" when the left end of each row is considered to be 0) is registered in the probability table 304 (when the bit string "1101" is encoded, P(x) of rows where x="–", "1", "10", and "110" is updated). FIG. 4B illustrates a case where the probability values referred to from the probability tables 304 and 314 are changed by learning.

In the range encoding/decoding, when the bit string "1101" is frequently processed, it is learned that, in the probability tables 304 and 314, "1" is likely to appear first, "1" is likely to appear next when the history is "1", "O" is likely to appear next when the history is "11", and "1" is likely to appear next when the history is "110". As the learning of these probabilities progresses and the prediction of how the bits will appear becomes more accurate, the output code of the range encoding becomes shorter.

The flow of the encoding in FIG. 4A is as follows.

First step: A right 1/2 section [1/2 to 2/2] is left according to an input "1".

Second step: A right 1/2 section [3/4 to 4/4] is left according to an input "1".

Third step: A left 1/2 section [6/8 to 7/8] is left according to an input "0".

Fourth step: A right 1/2 section [13/16 to 14/16] is left according to an input "1".

The output code 401 is 13/16 (1101 in binary) included in the last section.

Meanwhile, the flow of the encoding in FIG. 4B is as follows.

First step: A right 3/4 section [1/4 to 4/4] is left according to an input "1".

Second step: A right 3/4 section [7/16 to 16/16] is left according to an input "1".

Third step: A left 3/4 section [28/64 to 55/64] is left according to an input "0".

Fourth step: A right 3/4 section [139/256 to 220/256] is left according to an input "1".

The output code 411 is 3/4 (11 in binary) included in the last section.

As a bit string is input as predicted by the probability (that is, as the bit string is identical to the bit history processed in the past), the size of the section left after the division becomes wider. Therefore, the number of bits required to express a coordinate value of the output code included in the finally left section is small. In the example of FIG. 4A, four bits are required since the probability table includes initial values, whereas in the example of FIG. 4B, two bits are required as a result of applying the learned probability table. In this manner, the range coding improves the compression rate by learning the bit appearance probability according to the bit history.

Note that the output code 401 or the output code 411 obtained as a result of the above-described encoding is given as an input code in a decoding process. For example, in a case where the output code 401 is given as an input code, first, P(x) where x="–" is acquired from the probability table 314. Then, it is specified, for the probability of P(x="–"), whether 13/16 is included in the section "0" or "1". Note that, in the case of FIG. 4A, since P(x) is 0.5 for any x, P(x="–") is obtained as 1/2, and 13/16 is determined to exist in the range of 1/2 to 2/2 of the equally divided 0/2 to 2/2 section, and as a result, the first bit is specified as "1".

Subsequently, since the first bit is specified, P(x="1")=0.5 is obtained by referring to the probability table 314, and it is determined whether 13/16, which is the output code 401, is included in the section "0" or "1". In this case, since 13/16 is included in the range of 3/4 to 4/4 in the 2/4 to 4/4 section, the second bit is specified as "1". Subsequently, a section including the output is obtained again by referring to the probability table using the bit history (x=11), and a value of a corresponding bit is specified. By sequentially repeating this operation, the input bit string can be decoded from the output code.

Note that the probability for each bit history (x) in the probability table 314 is updated every time 1 bit is decoded, and the updates follow a process similar to that when the encoder 301 generates the output code 303. That is, when the input code 312 is decoded from the head (that is, specified from the head bit of the bit history 315), at the initial stage, similarly to the initial stage when the encoder 301 generates the output code 303, section division is executed on the basis of probability information close to the initial value, and the bit history 315 including the input code 312 is specified. When the output code 303 and the input code 312 are the same, the same bit history is also specified at the time of section division.

Then, as the decoding progresses, the update of the probability table 314 progresses, and probability information corresponding to the feature of the bit history 315 appears. The section division corresponding to the probability information of which learning has progressed according to the feature of the bit history 315 is the same as the section division at the time of the encoding process. Therefore, when the input code 312 and the output code 303 are the same, the bit string specified for the calculated section division is uniquely specified, and the input bit string 302 can be decoded as the output bit string 313.

(2-5) Flowchart of Range Encoding/Decoding

Figure 5A:
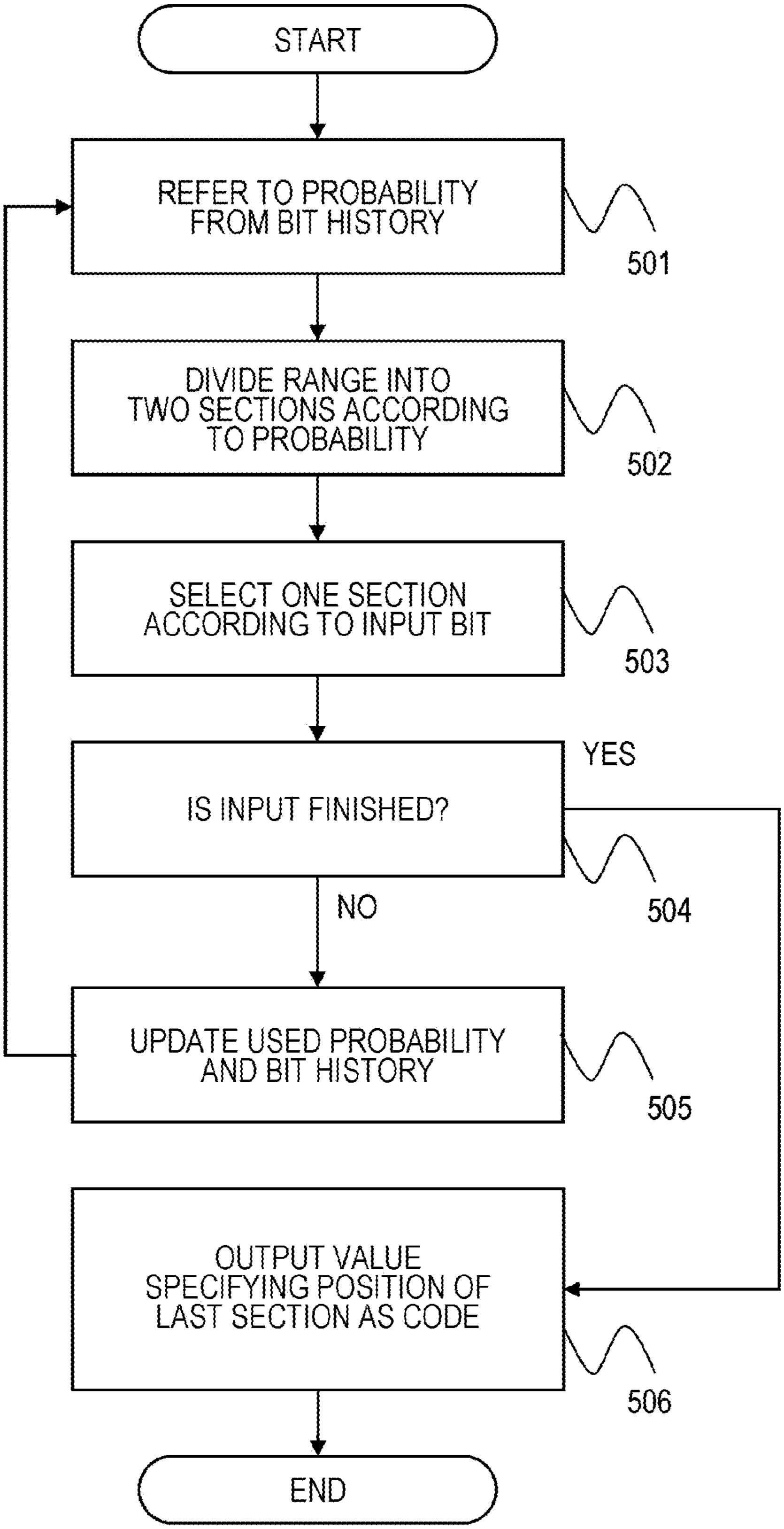
FIG. 5A illustrates a flowchart of a range encoding process.
Figure 5B:
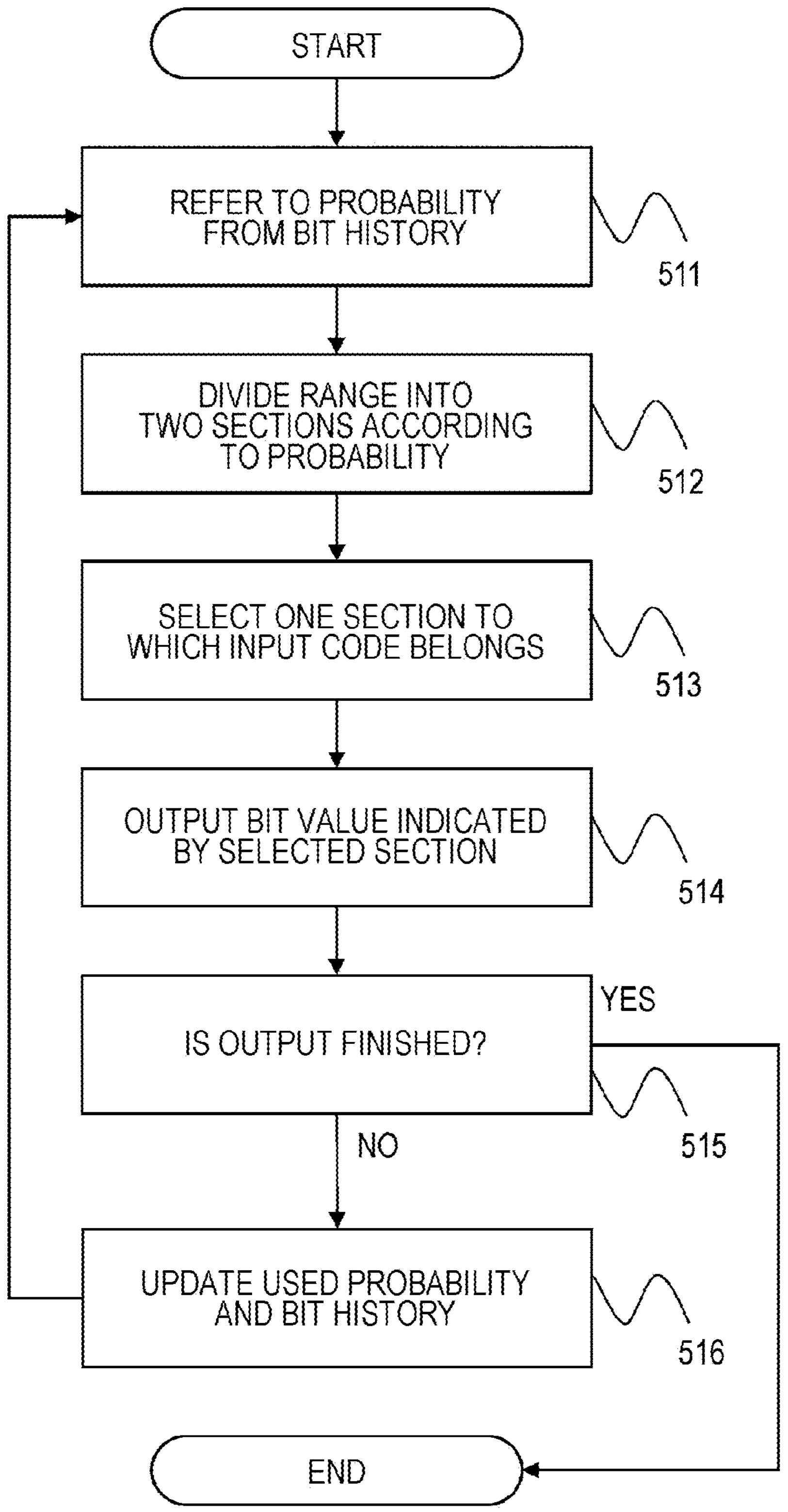
FIG. 5B illustrates a flowchart of a range decoding process.

FIG. 5A illustrates a flowchart of an example of range encoding. FIG. 5B illustrates a flowchart of an example of range decoding. First, a range encoding procedure will be described with reference to FIG. 5A.

The encoder 301 refers to a probability value at which the next bit is "0" from the probability table 304 according to an input bit history (501). The encoder 301 divides the numerical axis range (the range to be divided) into two sections according to the probability value (502). At the time of division, the probability value is multiplied by a range size. This is the most time-consuming part in the encoding process. Then, the encoder 301 selects one of the two sections depending on whether the input bit value is "0" or "1" (503).

Next, in step 504, the encoder 301 determines whether the input of the bits is finished. When the input of the bits is finished (504: YES), the process proceeds to step 506, and when there is still an input (504: NO), the process proceeds to step 505.

In step 505, the encoder 301 updates the probability value used in the probability table 304 and updates the bit history for encoding the next bit. The probability value is updated to be increased when the input bit value is "0", and is decreased when the input bit value is "1". For example, when the input bit next to "11" is "0", the bit history is updated to "110". Then, the encoder 301 returns to step 501 and continues the encoding process.

On the other hand, in step 506, the encoder 301 outputs, as a code, a coordinate value specifying the last left section, for example, a value included in the last left section expressed in the smallest number of bits, and ends the encoding process.

An example of a range decoding procedure will be described with reference to FIG. 5B. The decoder 311 refers to a probability table 314 according to an output bit history, and acquires a probability value at which the next bit is "0" (511). The decoder 311 divides the numerical axis range into two sections according to the probability value (512). At the time of division, the probability value is multiplied by a range size. This is the most time-consuming part in the decoding process. Then, the decoder 311 selects one of the two sections in which the value of the input code is included (513). The decoder 311 outputs the bit value "0" or "1" indicated by the selected section (514).

Next, in step 515, the decoder 311 determines whether the output of the bits is finished. When the output of the bits is finished (515: YES), the decoding process ends, and when there is still an output (515: NO), the process proceeds to step 516.

In step 516, the decoder 311 updates the probability value used in the probability table 314 and updates the bit history for decoding the next bit. The probability value is updated to be increased when the output bit value is "0", and is decreased when the output bit value is "1". For example, when the output bit next to "11" is "0", the bit history is updated to "110". Then, the decoder 311 returns to step 511 and continues the decoding process.

Note that in the above-described coding including both encoding and decoding, the probability table is updated every time each bit of a given bit string (symbol stream) is processed. As the bit string to be processed becomes longer, a probability distribution more suitable for the bit string is acquired, and the compression efficiency increases (that is, as a bit is positioned closer to the end of the bit string to be processed, a higher compression effect will be produced).

As well as such a method of adaptively updating the probability table, it is also possible to create a probability table by checking all bit strings before the start of encoding, and then use this probability table as a fixed parameter for encoding and decoding. In a case where the probability table is created and used independently of the encoding/decoding process as compared with the adaptively updating method described above, since the probability (section division) is independent from the position in the bit stream to be processed, encoding or decoding can be performed from a position other than the head position. However, in this case, the encoder 301 and the decoder 311 need to share the same probability table.

(3) Method for Speeding Up Range Encoding Process

Figure 6:
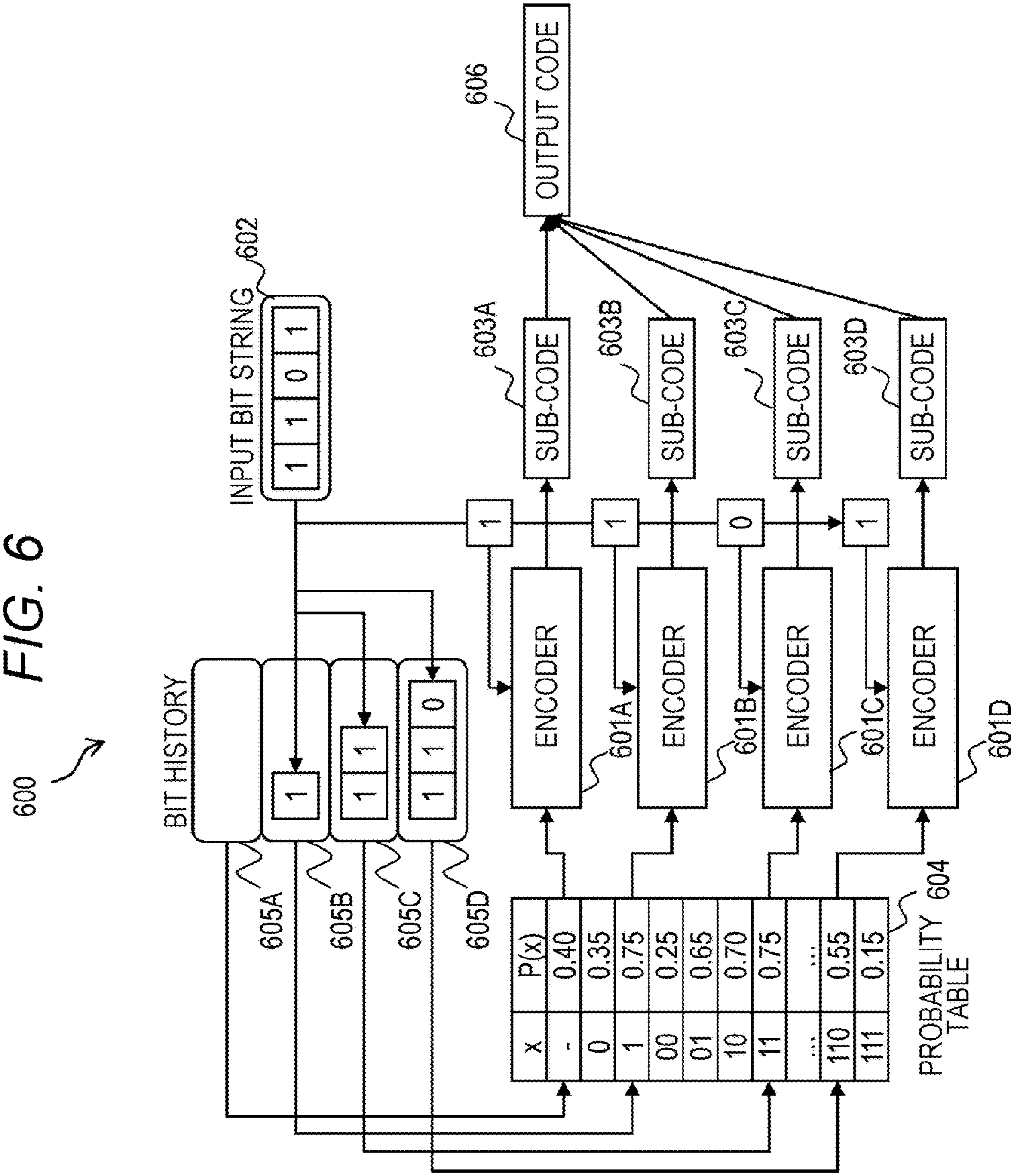
FIG. 6 illustrates a functional block diagram of a method for speeding up the range encoding process.

FIG. 6 is a functional block diagram of an example of a method for speeding up the range encoding process. The LZMA compression/decompression circuit 104 of FIG. 1 performs a compression process illustrated in this block diagram. In the examples described with reference to FIGS. 3A to 5B, a multiplication process is performed with reference to a probability every time one bit is input. Therefore, only one bit can be processed in one operation cycle, which may cause slow processing performance of the LZMA algorithm.

A range encoding function 600 illustrated in FIG. 6 speeds up the range encoding process by operating a plurality of encoders simultaneously. That is, N ranges to be divided are prepared (N>1), and N types of bit histories are prepared in advance from the input bit string. The range encoding function 600 simultaneously refers to N probability values in the probability table and executes multiplication processes on N input bits in parallel, thereby improving encoding performance N times.

FIG. 6 illustrates an encoding example in a case where N=4 according to the speeding-up technology. Each of the four encoders 601A to 601D performs a process similar to that of the encoder 301 in FIG. 3A. Each encoder acquires one probability value from a probability table 604 and uses the acquired probability value. The four probability values are obtained by referring to bit histories 605A to 605D as indexes.

The bit history 605A is used when the first bit "1" of the input bit string 602 is processed by the encoder 601A, and the value thereof is NULL. The bit history 605B is used when the second bit "1" of the input bit string 602 is processed by the encoder 601B, and the value thereof is "1".

The bit history 605C is used when the third bit "0" of the input bit string 602 is processed by the encoder 601C, and the value thereof is "11". The bit history 605D is used when the fourth bit "1" of the input bit string 602 is processed by the encoder 601D, and the value thereof is "110".

In general terms, a bit history used for encoding an Nth bit is configured by concatenating 1st to (N−1)th bits. By preparing the four types of bit histories in this manner, the four encoders 601A to 601D can simultaneously refer to four probability values from the probability table 604, and simultaneously perform multiplications using these probability values.

Four sub-codes 603A to 603D output from the encoders 601A to 601D are finally coupled to constitute an output code 606. The output code 606 corresponds to compressed data of the LZMA algorithm. According to this method, a 4-bit input can be processed in one operation cycle, thereby improving the range encoding performance in the compression process of the LZMA algorithm by four times as compared with the performance of the conventional method.

Figure 7:
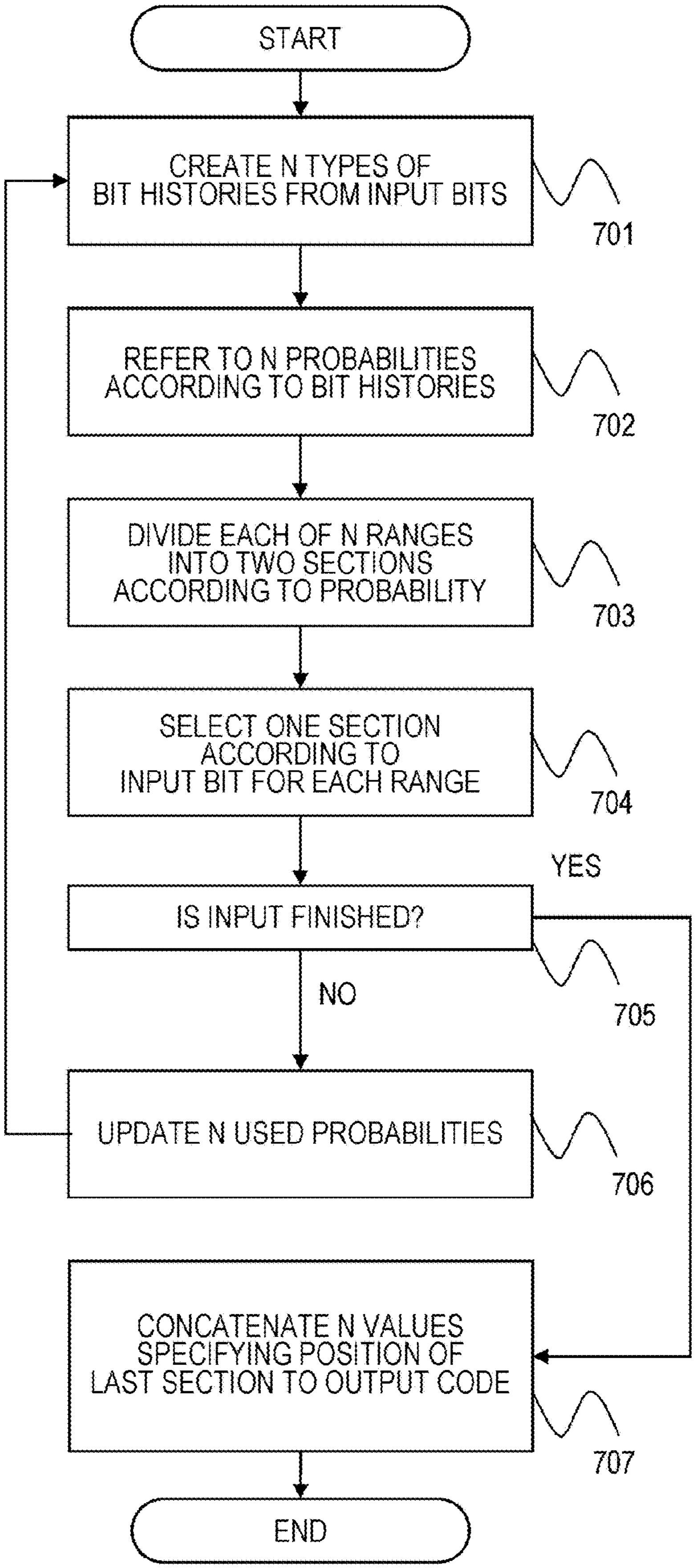
FIG. 7 illustrates a flowchart of the method for speeding up the range encoding process.

FIG. 7 illustrates an example of a flowchart of a method for speeding up the range encoding described with reference to FIG. 6. A procedure of the method for speeding up the range encoding will be described with reference to the flowchart of FIG. 7. First, the LZMA compression/decompression circuit 104 creates N types of bit histories to be used for encoding N bits of the input bit string (701). N is an integer of 2 or more. The N encoders acquire probability values at which the next bits are "0" from the probability table according to the respective bit histories (702). The N encoders divide respective N numerical axis ranges (ranges to be divided) into two sections according to the probability values (703).

Multiplications of the range sizes and the probability values are performed by the N encoders in parallel. In the first cycle, the numerical axis range (range size) is common to the N encoders, and is [0,1) in the example illustrated in FIG. 6. In the second and subsequent cycles, the target numerical axis range (range size) is a section selected by the encoding in the previous cycle. Each of the encoders selects one of the two left and right sections depending on whether the input bit value is "0" or "1" (704).

Next, in step 705, the LZMA compression/decompression circuit 104 determines whether the input of the bits is finished. When the input of the bits is finished (705: YES), the process proceeds to step 707, and when there is still an input (705: NO), the process proceeds to step 706. In step 706, the LZMA compression/decompression circuit 104 updates the N probability values used in the probability table. The probability value is updated to be increased when the input bit value is "0", and is decreased when the input bit value is "1".

Then, the LZMA compression/decompression circuit 104 returns to step 701 and continues the encoding process. For example, in a case where N is 4 and an 8-bit literal character is encoded, the first four bits are encoded in the first cycle of the flow, and the second four bits are encoded in the second cycle of the flow. In the second cycle, the bit history used for encoding the fifth bit is a bit string of the first four bits.

For example, when the input bit string is 6 bits, for example, the first four or three bits are encoded in the first cycle, and the second two or three bits are encoded in the second cycle. The maximum value of the bit string input to the LZMA compression/decompression circuit 104 is 4, and a bit string of four or fewer bits can be encoded.

In step 707, each encoder generates a coordinate value specifying the last left section, for example, a value included in the last left section expressed in the smallest number of bits. The LZMA compression/decompression circuit 104 outputs a bit string obtained by concatenating the N values as a code, and ends the encoding process.

In the example of the range encoding illustrated in FIG. 6, the integer N>1, and the number of input bits is N, that is, the maximum length of the bit history is (N−1) bits. This range encoding makes it possible to speed up the encoding N times by using N ranges to be divided. As mentioned in the example of the 8-bit literal character described with reference to FIG. 7, when the integer M>N, and the number of input bits is M, that is, when the maximum length of the bit history is (M−1) bits, it is possible to speed up the encoding of the input bits by using N ranges to be divided.

Hereinafter, the method will be described using a case where M=8 and N=4 as an example. The LZMA compression/decompression circuit 104 includes a probability table with 255 entries using bit histories of up to 7 bits as indexes. The LZMA compression/decompression circuit 104 prepares four types of bit histories (NULL, 1 bit, 2 bits, and 3 bits, respectively) to be used for encoding the first four bits of the 8-bit input bit string, and simultaneously refers to the four probability values corresponding thereto in the probability table. Using these probability values, the LZMA compression/decompression circuit 104 encodes the first four bits in parallel in the first cycle.

Next, the LZMA compression/decompression circuit 104 prepares four types of bit histories (4 bits, 5 bits, 6 bits, and 7 bits each including the first four bits at the head) to be used for encoding the second four bits among the input bits, and simultaneously refers to the corresponding four probability values from the probability table. Using these probability values, the LZMA compression/decompression circuit 104 encodes the second four bits in parallel in the second cycle.

In this manner, the LZMA compression/decompression circuit 104 processes an 8-bit input in two cycles (i.e., four-times performance), generates four sub-codes, and constructs an output code by concatenating the four sub-codes.

In general terms, the performance of the range code encoding process in which the M bits are input is improved by processing the M bits in [M/N] operation cycles using a probability table having (2^M−1) entries with bit histories of maximum (M−1) bits as indexes, and N encoders. Note that the LZMA compression/decompression circuit 104 may generate sub-codes without performing processes in parallel.

(4) Method for Speeding Up Range Decoding Process

The range decoding process can be sped up N times by simply operating N decoders 311 of FIG. 3B in parallel. This is because a bit history to be used in a process of a certain decoder X is not determined until a decoder Y that decodes the previous bit outputs a processing result. Therefore, the decoder X cannot refer to a probability value from the probability table and perform a multiplication using the probability value at the same time as the decoder Y, and parallelization cannot be realized.

Figure 8:
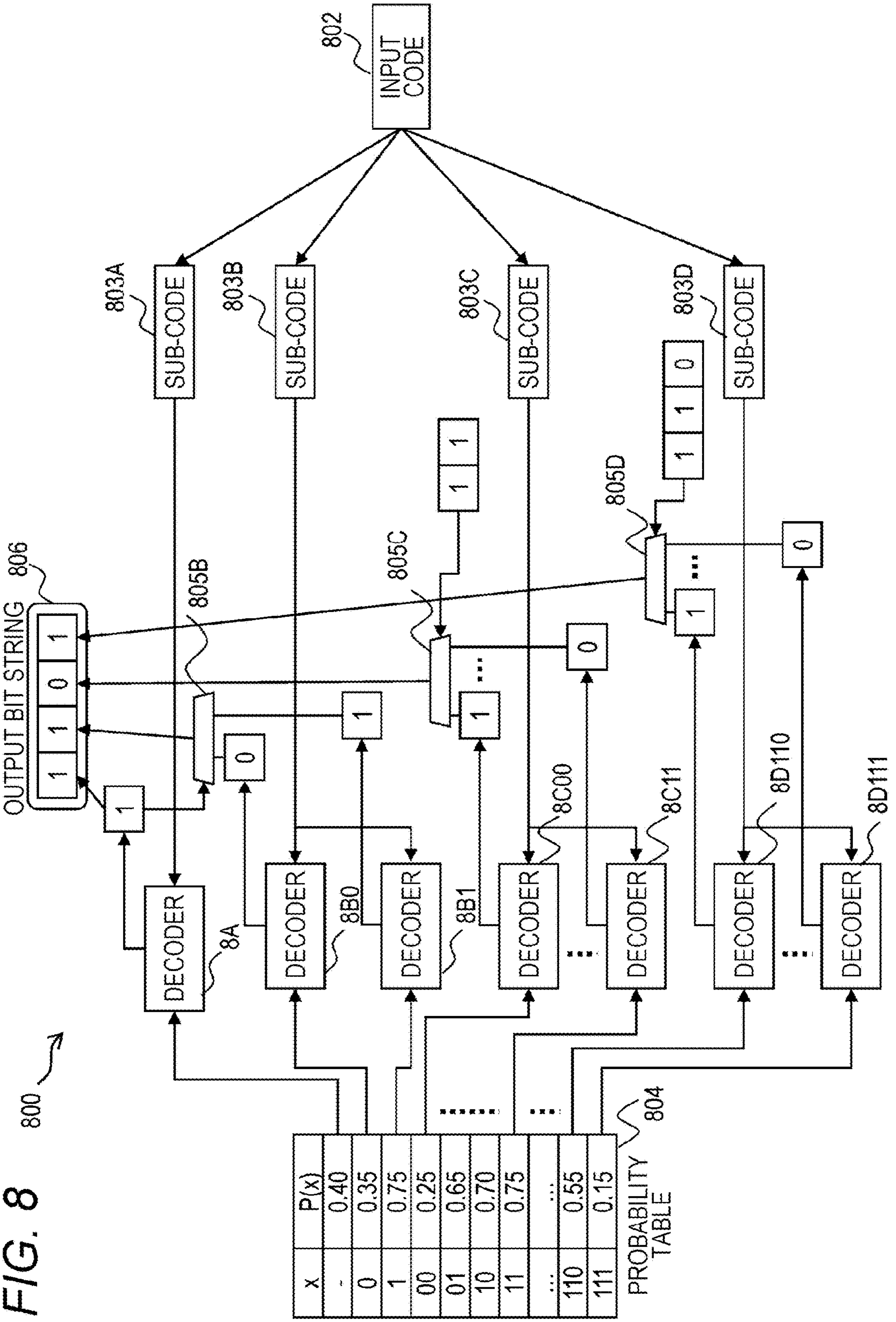
FIG. 8 illustrates a functional block diagram of a method for speeding up the range decoding process.

Hereinafter, a method for speeding up the range decoding process according to an embodiment of the present specification will be described. FIG. 8 is a functional block diagram of a method for speeding up the range decoding process. The LZMA compression/decompression circuit 104 in FIG. 1 performs a decompression process using a range decoding function 800 illustrated in this block diagram.

FIG. 8 illustrates a range decoding example in a case where N=4, that is, the number of bits of the output bit string is 4. Each of the 15 decoders 8A (one decoder), 8B0 and 8B1 (two decoders), 8000 to 8C11 (four decoders), and 8D000 8D111 (eight decoders) performs a process similar to that of the decoder 311 in FIG. 3B. In FIG. 8, some of the decoders are not illustrated. Four sub-codes 803A to 803D input to the 15 decoders are separated from an input code 802 (corresponding to compressed data of the LZMA algorithm), and are the same as the four sub-codes 603A to 603D in FIG. 6. Note that one sub-code may be shared by a plurality of decoders.

Each decoder acquires one probability value from a probability table 804, uses the acquired probability value, and outputs a candidate bit value. These 15 probability values are values obtained by referring to all possible bit histories as indexes.

The value of the bit history used by one decoder 8A for decoding a first bit of an output bit string 806 is NULL. The values of the bit histories used by the two decoders 8B0 and 8B1 for decoding a second bit of the output bit string 806 are "0" and "1", respectively.

The values of the bit histories used by the four decoders 8C00 to 8C11 for decoding a third bit of the output bit string 806 are "00", "01", "10", and "11", respectively. The values of the bit histories used by the eight decoders 8D000 to 8D111 for decoding a fourth bit of the output bit string 806 are "000", "001", "010", "011", "100", "101", "110", and "111", respectively.

In general terms, the number of bit histories used for decoding a Kth bit is 2^(K−1). Each bit history is a bit pattern (bit string) of (K−1) bits that are possible as first to (K−1)th bits of the output bit string 806. By preparing 15 types of bit histories in this manner, 15 probability values are simultaneously referred to from the probability table 804, and the 15 decoders simultaneously perform multiplications using these probability values.

When the first bit of the output bit string 806 output by the decoder 8A is "1", it can be seen that the second bit output by the decoder 8B1, which has performed decoding assuming that the first bit is "1", among the decoders 8B0 and 8B1 is a correct result. Therefore, a selector 805B selects "1" output by the decoder 8B1 from among the two second bit candidates output by the decoders 8B0 and 8B1. That is, the first and second bits are determined as "11".

As a result, it can be seen that the third bit output by the decoder 8C11, which has performed decoding assuming that the first and second bits are "11", among the decoders 8C00 to 8C11 is a correct result. Therefore, a selector 805C selects "0" output by the decoder 8C11 from among the four third bit candidates output by the decoders 8C00 to 8C11. That is, the first to third bits are determined as "110".

As a result, it can be seen that the fourth bit output by the decoder 8D110, which has performed decoding assuming that the first to third bits are "110", among the decoders 8D000 to 8D111 is a correct result. Therefore, a selector 805D selects "1" output by the decoder 8D110 from among the eight fourth bit candidates output by the decoders 8D000 to 8D111.

In this manner, it is determined that the four bits of the output bit string 806 are "1101". In general terms, the LZMA compression/decompression circuit 104 includes 2^(K−1) decoders for decoding a Kth bit, and holds 2^(K−1) Kth bit candidates output by the 2^(K−1) decoders. The LZMA compression/decompression circuit 104 selects, as the Kth bit, a candidate output by one decoder that has performed decoding assuming that the values of the already determined first to (K−1)th bits are bit histories.

The bit selecting processes performed by the selectors 805B to 805D are performed in a sufficiently shorter time than the multiplication processes performed by the decoders. Therefore, according to this method, a four-bit output can be processed in one operation cycle. Therefore, the performance of the range decoding process in the decompression process of the LZMA algorithm is improved by four times as compared with the performance of the conventional method.

Figure 9:
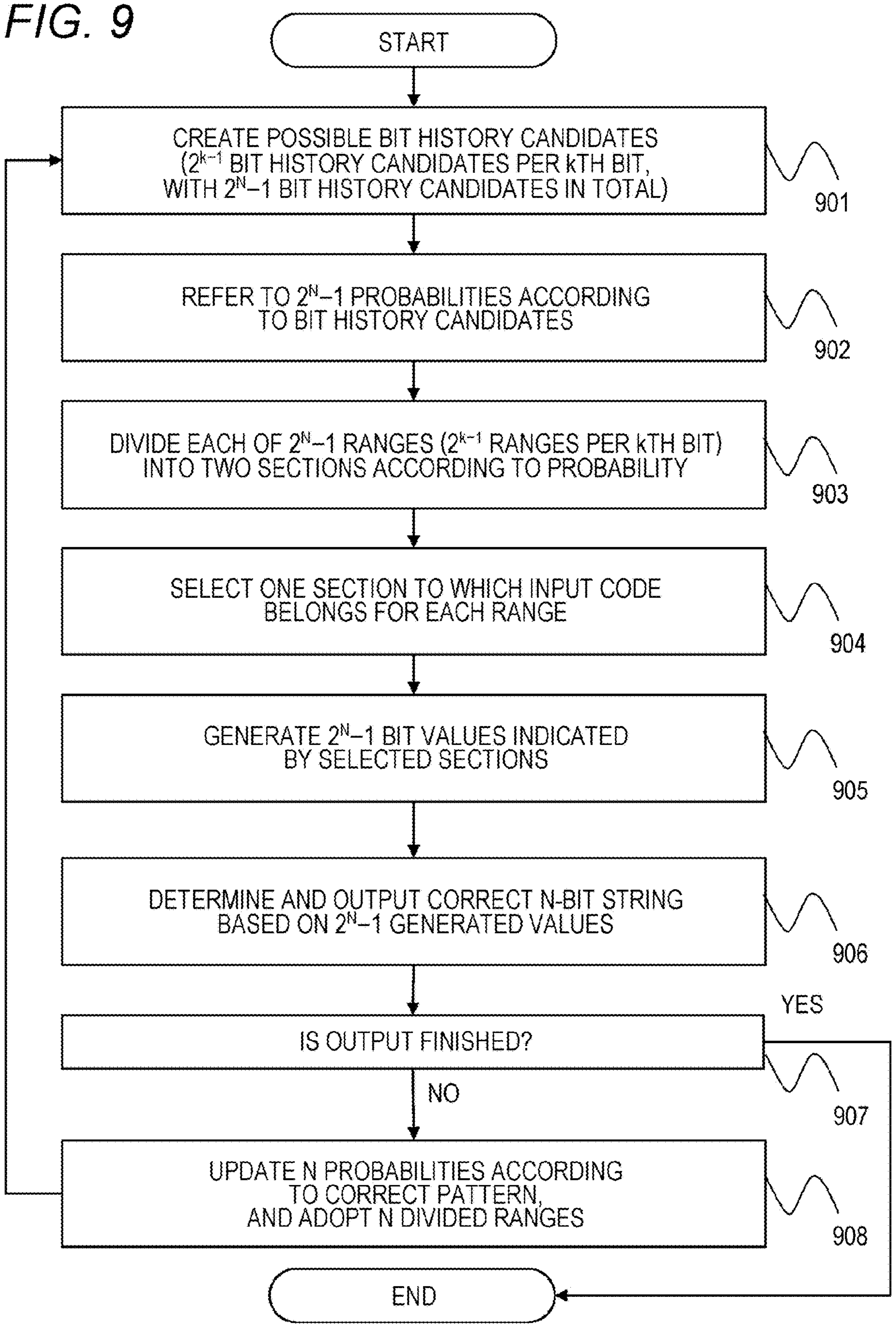
FIG. 9 illustrates a flowchart of the method for speeding up the range decoding process.

A procedure of the method for speeding up the range decoding described with reference to FIG. 8 will be described below with reference to FIG. 9. First, the LZMA compression/decompression circuit 104 creates (2^N−1) bit histories that may be possibly used to decode N bits of the output bit string (901). The number of bit histories used for decoding the Kth bit is 2^(K−1).

Each of the (2^N−1) decoders acquire a probability value at which the next bit is "0" from the probability table 804 according to the bit history corresponding to each decoder (902), and divides the numerical axis range (range to be divided) into two sections according to the probability value (903). The 2^(K−1) decoders used for decoding the Kth bit share a numerical axis range to be divided. Specifically, in the first cycle, all the decoders share a common numerical axis range, which is [0,1) in the example of FIG. 8. In the second and subsequent cycles, the numerical axis range of the decoder for the Kth bit is a range as a result of division by the decoder that has output the Kth bit as a correct answer in the previous cycle. At the time of division, a range size and a probability value are multiplied.

The decoder selects a section in which the value of the input sub-code is included from among the two sections (904), and generates a bit value "0" or "1" represented by the selected section (905). The number of generated bit values is (2^N−1), and the number of Kth bit candidates is 2^(K−1). Then, the selectors each select one correct bit from the candidates for the corresponding bit in order from the first bit, determine and output an N-bit pattern (906). When a correct value for the Kth bit is selected, the correct values for the first to (K−1)th bits are used as bit histories.

Next, in step 907, the LZMA compression/decompression circuit 104 determines whether the output of the bits is finished. When the output of the bits is finished (907: YES), the decoding process is finished, and when there is still an output (907: NO), the process proceeds to step 908.

In step 908, the LZMA compression/decompression circuit 104 updates the N probability values used in the probability table 804. The probability value is updated to be increased when the output bit value is "0", and is decreased when the output bit value is "1". Furthermore, the LZMA compression/decompression circuit 104 adopts the section selected in step 904 by the decoder that has output the correct bit value as a numerical axis range of the next cycle. The section selected in step 904 by one decoder that has output the correct value for the Kth bit among the 2^(K−1) decoders for the Kth bit is adopted as a numerical axis range to be divided in step 903 in the decoding for the next Kth bit.

Then, the LZMA compression/decompression circuit 104 returns to step 901 and continues the decoding process. For example, in a case where the first four bits and the second four bits of an 8-bit literal character are encoded in two cycles, the bit history used for decoding the fifth bit in the second cycle of the flow is a bit string of the first four bits.

For example, in a case where 6-bit input data is divided into the first four bits and the remaining two bits and encoded in two cycles, the LZMA compression/decompression circuit 104 may decode the four or three bits in the first cycle and then decode the two or three bits in the second cycle. The maximum value of the bit string input to the LZMA compression/decompression circuit 104 is 4, and a bit string of four or fewer bits can be decoded.

In the method for speeding up the range code decoding process illustrated in FIG. 8, when the integer N>1, the number of input bits is N (that is, the maximum length of the bit history is (N−1) bits), and N ranges to be divided are used to speed up the range code decoding process by N times. As mentioned in the example of the 8-bit literal character with reference to FIG. 9, when the integer M>N, and the number of input bits is M, that is, when the maximum length of the bit history is (M−1) bits, it is possible to speed up the decoding of the output bit string by using N ranges to be divided.

Hereinafter, an example of decoding an 8-bit output bit string will be described. The LZMA compression/decompression circuit 104 includes 15 decoders as in FIG. 8, and inputs four sub-codes separated from an input code (corresponding to compressed data of the LZMA algorithm) to the 15 decoders as in FIG. 8. Each decoder acquires and uses one probability value from a probability table with 255 entries using bit histories of up to 7 bits as indexes.

The 15 probability values referred to in the first cycle are values obtained by referring to all possible bit histories (NULL, 1 bit, 2 bits, and 3 bits, respectively) for the first 4 bits of the 8-bit output bit string as indexes. The value of the bit history used by one decoder that decodes a first bit of the output bit string is NULL.

The values of the bit histories used by the two decoders that decode a second bit of the output bit string are "0" and "1", respectively. The values of the bit histories used by the four decoders that decode a third bit of the output bit string are "00", "01", "10", and "11", respectively. The values of the bit histories used by the eight decoders that decode a fourth bit of the output bit string are "000", "001", "010", "011", "100", "101", "110", and "111", respectively.

The 15 decoders perform multiplications using the probability values referred to by the bit histories in parallel. Then, as in FIG. 8, the values from the first bit to the fourth bit are sequentially determined through bit selecting processes performed by the selectors. Here, it is assumed that the values from the first bit to the fourth bit, are for example, "1101".

Next, the 15 probability values referred to in the second cycle are values obtained by referring to all possible bit histories (4 bits, 5 bits, 6 bits, and 7 bits, each including "1101" determined in the first cycle at the head) for the second 4 bits of the 8-bit output bit string as indexes.

The value of the bit history used by one decoder that decodes a fifth bit of the output bit string is "1101". The values of the bit histories used by the two decoders that decode a sixth bit of the output bit string are "11010" and "11011", respectively. The values of the bit histories used by the four decoders that decode a seventh bit of the output bit string are "110100", "110101", "110110", and "110111", respectively.

The values of the bit histories used by the eight decoders that decode an eighth bit of the output bit string are "1101000", "1101001", "1101010", "1101011", "1101100", "1101101", "1101110", and "1101111", respectively.

The 15 decoders perform multiplications using the probability values referred to by the bit histories in parallel. Then, as in FIG. 8, the values from the fifth bit to the eighth bit are sequentially determined through bit selecting processes performed by the selectors.

As in FIG. 8, the bit selecting processes performed by the selectors are performed in a sufficiently shorter time than the multiplication processes performed by the decoders. Therefore, according to this method, an 8-bit output can be processed in two operation cycles. As described above, in the probability table with 255 entries, 15 entries are referred to in the first cycle, and 15 entries are selected from among the remaining 240 entries and referred to in the second cycle. In the second cycle, the number of entries to be referred to is reduced to 1/16 using a bit history including the first four bits determined in the first cycle as an index.

In general terms, the performance of the range code decoding process in which the M bits are output is improved by processing the M bits in [M/N] operation cycles using a probability table having (2^M−1) entries with bit histories of the maximum (M−1) bits as indexes, and (2^N−1) decoders.

As described above, according to an embodiment of the present specification, data compressed by a range code can be decompressed at a high speed. Therefore, for example, in a device storage system having a data compression function using a range coding algorithm, responding performance in reading compressed data can be improved.

(5) Post-Process Compression

Figure 10:
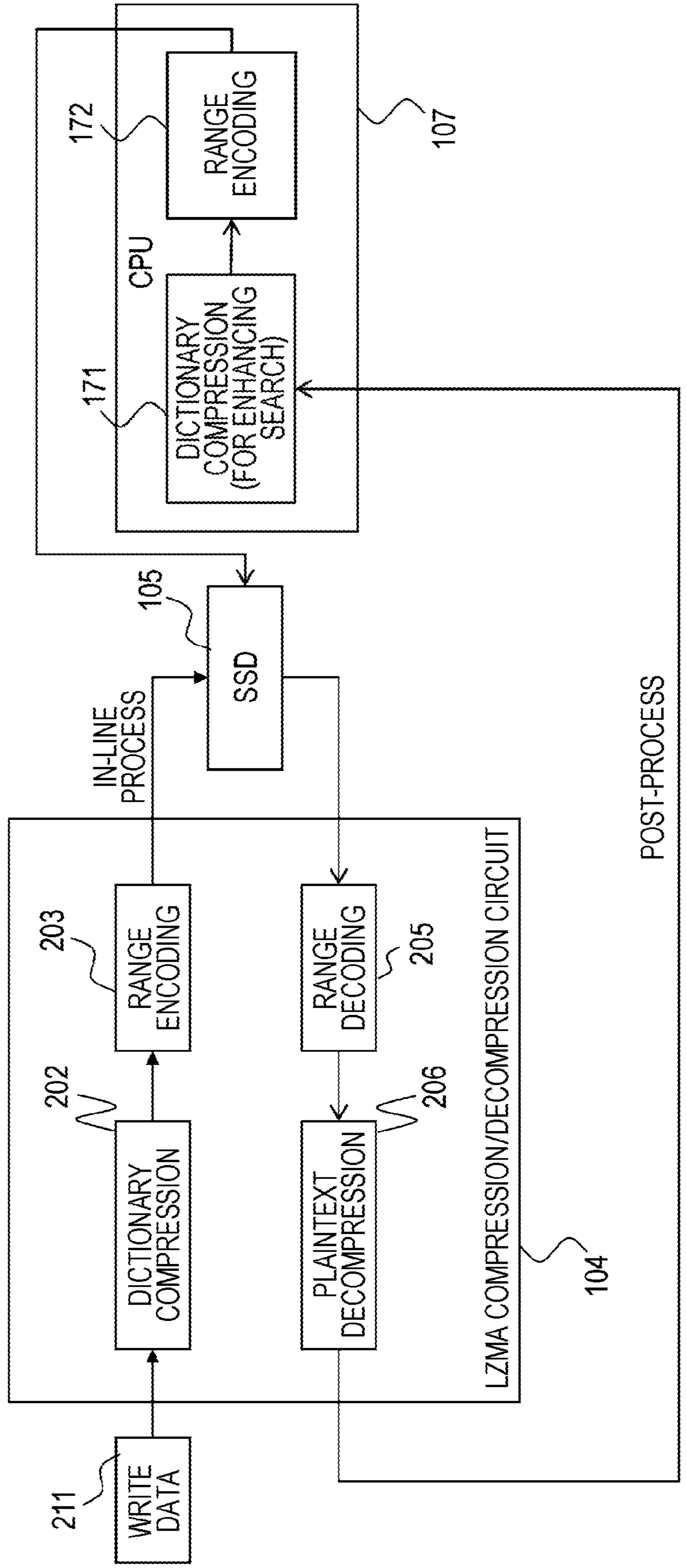
FIG. 10 is a logical configuration diagram for explaining post-process compression.
Figure 11:
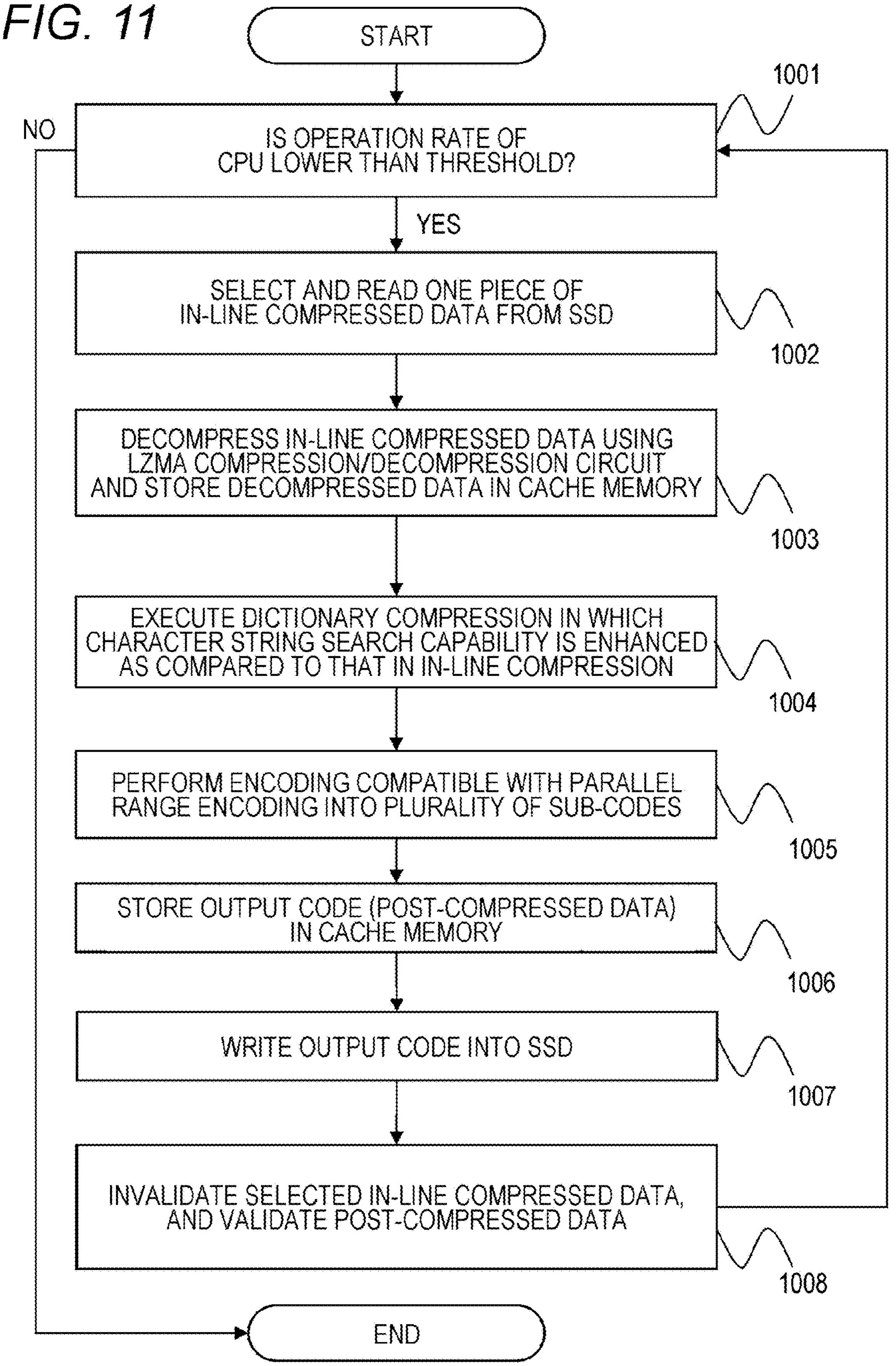
FIG. 11 is a flowchart for explaining post-process compression.

Hereinafter, post-process compression will be described. The post-process compression can improve the compression rate of data stored in the SSD 105 while suppressing the influence on the write access from the host to the storage system. FIG. 10 is a logical configuration diagram for explaining post-process compression, and FIG. 11 is a flowchart for explaining post-process compression.

Referring to FIG. 10, in the in-line compression, write data 211 from the host is compressed by the LZMA compression/decompression circuit 104, and the in-line compressed data is stored in the SSD 105. In the post-process compression, the LZMA compression/decompression circuit 104 decompresses the in-line compressed data stored in the SSD 105, the CPU 107 recompresses the decompressed data, and the recompressed data is stored in the SSD 105.

After dictionary compression 171, the CPU 107 executes range encoding 172 compatible with the range encoding 203 in the LZMA compression/decompression circuit 104 (using the same compression/decompression algorithm). The dictionary compression 171 (second dictionary compression) performed by the CPU 107 has a higher capability of searching for a matching character string than the dictionary compression 202 (first dictionary compression) performed by the LZMA compression/decompression circuit 104. As a result, the compression rate of the post-process compression can be higher than the compression rate of the in-line compression. In addition, since the range encoding 172 of the CPU 107 is compatible with the range encoding 203 in the LZMA compression/decompression circuit 104, compressed data can be decompressed using the LZMA compression/decompression circuit 104 in the read process, and therefore, the degradation of the read performance can be suppressed.

Note that the range encodings 203 and 172 may be omitted, and may be executed using another compression/decompression algorithm. The range encodings may be performed by a process different from the above-described parallel process. The data compression rate can be increased by executing the dictionary compression and encoding different from the dictionary compression, for example, entropy encoding such as range encoding or Huffman encoding.

Referring to FIG. 11, in step 1001, the CPU 107 compares a current operation rate of the CPU 107 with a preset threshold, and determines whether the operation rate is lower than the threshold. When the operation rate is higher than or equal to the threshold (1001: NO), the flow ends. When the operation rate is lower than the threshold (1001: YES), the flow proceeds to step 1002.

By starting post-process compression when the load of the CPU 107 is smaller than the threshold, the influence on another process can be reduced. A value representing a load of the CPU different from the operation rate of the CPU, such as the number of execution tasks, may be referred to. The load of the CPU may not be referred to, and the post-process compression may be performed, for example, periodically.

For example, the CPU 107 may execute the post-process compression together with garbage collection. The CPU 107 adds updated data at a certain address in the volume to a new address of the SSD 105. The old data stored at the above-described address in the SSD 105 becomes invalid data. In the garbage collection, valid data in the SSD 105 is collectively stored in a new address area, and an invalid data area is changed to a free area. In order to move the valid data, the CPU 107 executes post-process compression on the target data read from the SSD 105 and stores the compressed target data in a new address of the SSD 105. As a result, the post-process compression can be efficiently performed.

In step 1002, the CPU 107 selects and reads one piece of the in-line compressed data from the SSD 105, and stores the in-line compressed data in the cache memory 106. As described above, in the in-line compression, the write data from the host is compressed by the LZMA compression/decompression circuit 104 and stored in the SSD 105.

Data stored in the SSD 105 and not subjected to post-process compression may be managed by management information (not illustrated). For example, the management information may include an address in the volume, information on which post-process compression has not been completed, and address information of the SDD 105 that stores valid data at that address. The management information may be stored in a memory in the storage controller 103.

The management information may include information on whether the stored valid data has been subjected to post-process compression together with information on the time when the data is stored (updated). The CPU 107 may select data to be subjected to post-process compression on the basis of the data update time. For example, the CPU 107 may preferentially execute post-process compression on data having an old update time among candidate data to be subjected to post-process compression. The candidate data is valid data that has not been subjected to post-process compression. The CPU 107 may select data to be subjected to post-process compression from among the oldest data, or from among data for which the time has elapsed from update exceeds a threshold.

In step 1003, in response to an instruction from the CPU 107, the LZMA compression/decompression circuit 104 decompresses the in-line compressed data stored in the cache memory 106 and stores the decompressed data in the cache memory 106. By using the LZMA compression/decompression circuit 104, data can be efficiently decompressed in a short time.

In step 1004, the CPU 107 executes dictionary compression 171 in which the character string search capability is enhanced as compared to that in the in-line compression. As a result, it is possible to realize a compression rate higher than that in the in-line compression. For example, the CPU 107 executes the dictionary compression using a hash table in which the upper limit of the number of hash bits or the number of entries is great. Alternatively, the CPU 107 may perform the dictionary compression using a hash table in which the number of characters constituting the character string is small.

In the hash table, both the upper limits of the number of hash bits and the number of entries may be larger than the values in the in-line compression. The upper limit of the number of hash bits and/or the number of entries may be larger than the value in the in-line compression, and the number of characters constituting the character string may be smaller than the value in the in-line compression. The hash table may be stored in a memory in the storage controller 103.

In step 1005, the CPU 107 performs range encoding 172 compatible with the range encoding 203 of the LZMA compression/decompression circuit 104 to encode the data into a plurality of sub-codes. As a result, it is possible to perform high-speed processing using the LZMA compression/decompression circuit 104 when reading compressed data.

In step 1006, the CPU 107 stores an output code (post-process compressed data (post-compressed data in FIG. 11)) in the cache memory 106. In step 1007, the CPU 107 writes the post-process compressed data to an address area different from that of the original in-line compressed data in the SSD 105. In step 1008, the selected in-line compressed data is invalidated, and the post-process compressed data is validated. Specifically, the CPU 107 updates management information for managing the address of the SSD 105 and whether the stored data is valid/invalid.

Note that, in step S1006, the post-process compressed data may be stored in the cache memory, and subsequently, and the post-process compressed data on the cache memory may be written to the SSD 105 in parallel with the operation of transferring the data to a storage area on the cloud for storage to make a backup.

At this time, by limiting the backup onto the cloud at the time of the operation of writing the in-line compressed data to the SSD 105, it is possible to realize further enhanced data maintenance performance while reducing the capacity usage rate of the cloud in the hybrid environment in which the on-premises system and the cloud system are combined. Note that the data transfer onto the cloud may be performed at a timing other than the timing described above, and the entire system may be constructed as a hybrid cloud system so as to periodically transfer the post-process compressed data.

Furthermore, it is possible to adopt an aspect in which the backup function using the storage capacity on the cloud can be applied, for example, only to data storage on the cloud in a process (storage of post-process compressed data) after S1006. That is, the post-process compressed data is stored in the cache memory in S1006, and thereafter, the post-process compressed data is transferred to the storage area on the cloud.

At this time, the selection of data to which the post-process compression is applied can be processed, for example, on the basis of the most recent frequency of use of the in-line compressed data. For example, the foregoing frequency of use is monitored, and data of which the frequency of use is lower than a predetermined frequency (that is, data that is used infrequently) is specified as data to which post-process compression is to be applied, and such data is transferred onto the cloud after post-process compression to invalidate the corresponding in-line compressed data according to the process of S1008.

With such a hybrid system, it is possible to arrange data that is infrequently used at a high compression rate in the cloud environment, while ensuring responsiveness by arranging data that is frequently used in the on-premises environment. In other words, it is possible to achieve both the responsiveness regarding reading and writing of data and the effective operation of the storage area.

Second Embodiment

Figure 12:
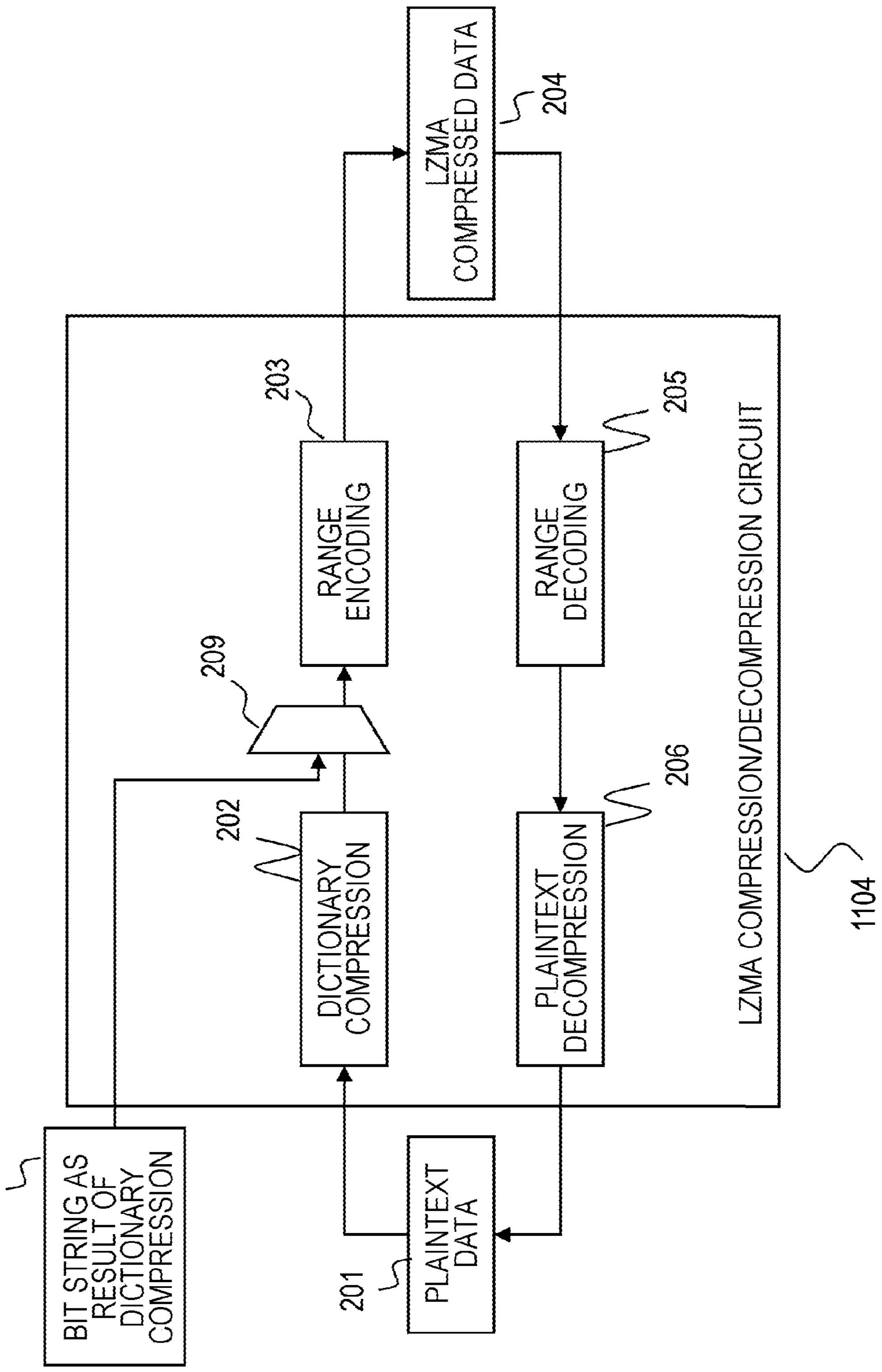
FIG. 12 is a logical configuration diagram for explaining another example of post-process compression.

Another embodiment of post-process compression will be described. Hereinafter, differences from the first embodiment will be mainly described. The description of the first embodiment can be applied to a configuration similar to that of the first embodiment. FIG. 12 is a logical configuration diagram for explaining post-process compression according to another embodiment, and FIG. 13 is a flowchart for explaining post-process compression according to another embodiment.

Referring to FIG. 12, in the post-process compression according to the present embodiment, data subjected to dictionary compression by the CPU 107 is compressed as an LZMA compression/decompression circuit 1104 performs range encoding 203. As a result, a reduction in the load on the CPU 107 and an increase in the speed of the compression process are realized. The LZMA compression/decompression circuit 1104 includes a selector 209 in addition to the configuration of the LZMA compression/decompression circuit 104 according to the first embodiment. The selector 209 selects dictionary compression 202 in the in-line compression, selects a bit string 215 as a result of dictionary compression performed by the CPU 107 in the post-process compression, and outputs the selected dictionary compression 202 and the selected bit string 215 to the range encoding 203.

Figure 13:
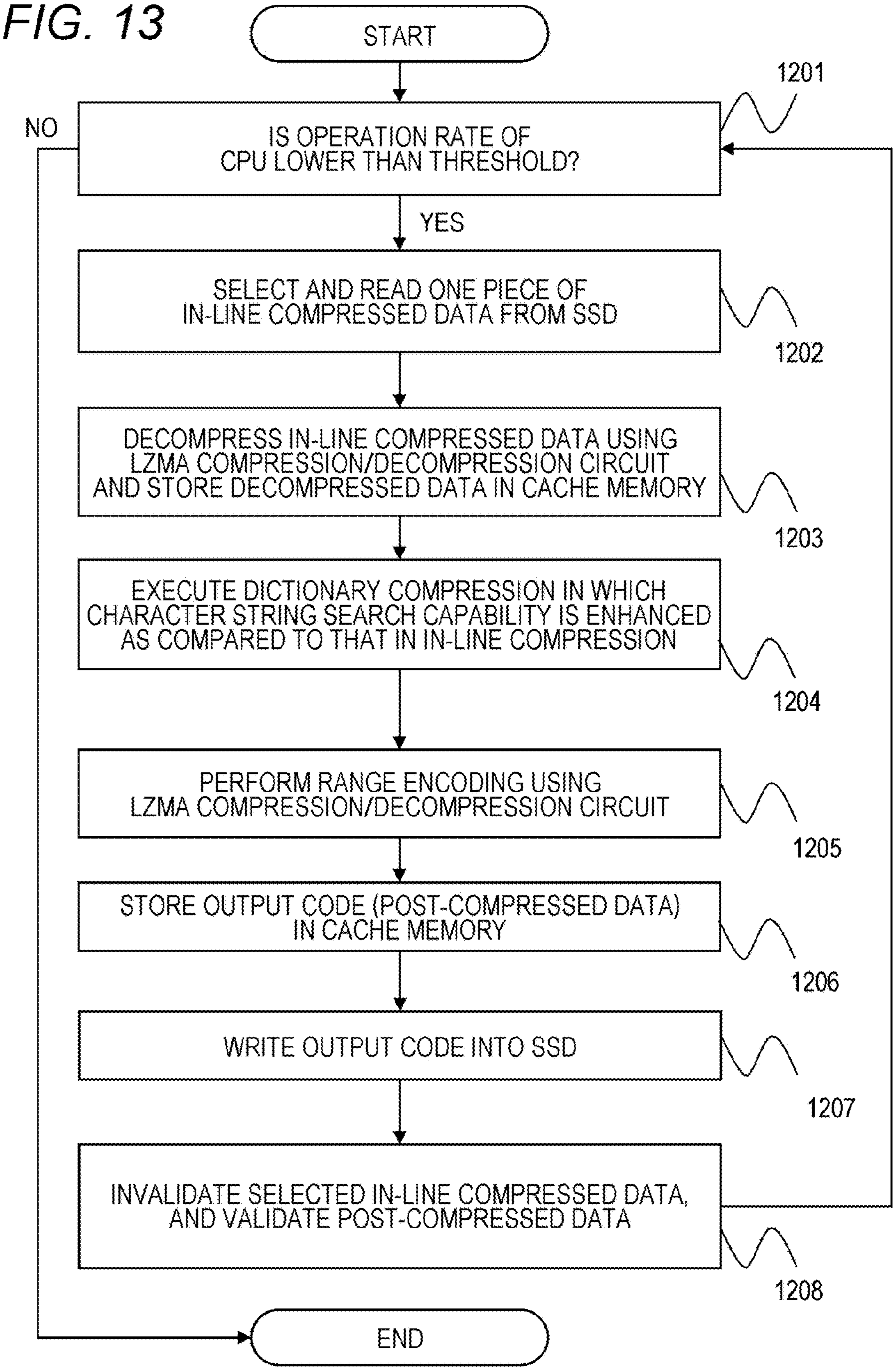
FIG. 13 is a flowchart for explaining another example of post-process compression.

Referring to FIG. 13, steps 1201 to 1204 are similar to steps 1001 to 1004 in the flowchart of FIG. 11. In step 1205, by performing the range encoding 203 using the LZMA compression/decompression circuit 1104, the CPU 107 compresses the data subjected to dictionary compression by the CPU 107. Steps 1206 to 1208 are similar to steps 1006 to 1008 in the flowchart of FIG. 11.

Note that, in step S1206, the post-process compressed data may be stored in the cache memory, and subsequently, and the post-process compressed data on the cache memory may be written to the SSD 105 in parallel with the operation of transferring the data to a storage area on the cloud for storage to make a backup.

At this time, by limiting the backup onto the cloud at the time of the operation of writing the in-line compressed data to the SSD 105, it is possible to realize further enhanced data maintenance performance while reducing the capacity usage rate of the cloud in the hybrid environment in which the on-premises system and the cloud system are combined. Note that the data transfer onto the cloud may be performed at a timing other than the timing described above, and the entire system may be constructed as a hybrid cloud system so as to periodically transfer the post-process compressed data.

Furthermore, it is possible to adopt an aspect in which the backup function using the storage capacity on the cloud can be applied, for example, only to data storage on the cloud in a process (storage of post-process compressed data) after S1206. That is, the post-process compressed data is stored in the cache memory in S1206, and thereafter, the post-process compressed data is transferred to the storage area on the cloud.

At this time, it is also possible to select the data to which the post-process compression is applied, for example, on the basis of the most recent frequency of use of the in-line compressed data. For example, the foregoing frequency of use is monitored, and data of which the frequency of use is lower than a predetermined frequency (that is, data that is used infrequently) is specified as data to which post-process compression is to be applied, and such data is transferred onto the cloud after post-process compression to invalidate the corresponding in-line compressed data according to the process of S1208.

With such a hybrid system, it is possible to arrange data that is infrequently used at a high compression rate in the cloud environment, while ensuring responsiveness by arranging data that is frequently used in the on-premises environment. In other words, it is possible to achieve both the responsiveness regarding reading and writing of data and the effective operation of the storage area.

In addition, the storage systems according to the first and second embodiments and the modifications thereof can reduce the amount of data, thereby reducing the storage capacity to be used, as a result reducing the number of storage drives, which save resources, and reducing the power consumption of the storage drives.

It should be noted that the present invention is not limited to the above-described embodiment, and includes various modifications. For example, the above-described embodiments have been described in detail in order to explain the present invention in an easy-to-understand manner, and are not necessarily limited to having all the configurations described above. Further, a part of the configuration of one embodiment may be replaced with the configuration of another embodiment, and the configuration of one embodiment may be added to the configuration of another embodiment. Further, with respect to a part of the configuration of each embodiment, it is possible to perform addition of another configuration, deletion, or replacement with another configuration.

Further, some or all of the above-described configurations, functions, processing units, and the like may be realized by hardware, for example, by designing an integrated circuit. Further, each of the above-described configurations, functions, and the like may be realized by software by a processor interpreting and executing a program realizing each of the functions. Information such as a program, a table, a file, or the like for realizing each of the functions can be provided in a recording device such as a memory, a hard disk, or an SSD, or may be provided in a recording medium such as an IC card or an SD card.

In addition, control lines and information lines indicate what is considered to be necessary for the description, and do not necessarily indicate all the control lines and the information lines on the product. In practice, it may be considered that almost all components are connected to each other.

What is claimed is:

1. A storage system comprising:
a controller including a processor and a data compression/decompression circuit,
wherein the controller performs in-line compression of plaintext data from a host and post-process compression of in-line compressed data stored in one or more storage drives,
wherein the in-line compression includes:
generating in-line compressed data by executing a compression process including first dictionary compression on the plaintext data from the host using the data compression/decompression circuit; and
storing the in-line compressed data in the one or more storage drives,
wherein the post-process compression includes:
generating the plaintext data by decompressing the in-line compressed data read from the one or more storage drives using the data compression/decompression circuit; and
generating post-process compressed data by executing a compression process including second dictionary compression on the plaintext data using the processor, the second dictionary compression being more excellent in character string search capability than the first dictionary compression, and storing the post-process compressed data in the one or more storage drives, and
wherein a number of characters of a character string in a hash table for the second dictionary compression is smaller than that in a hash table for the first dictionary compression.

2. The storage system according to claim 1, wherein
the compression process performed by the data compression/decompression circuit includes encoding different from the first dictionary compression using a first compression/decompression algorithm after the first dictionary compression is executed, and
in the post-process compression, after the processor compresses the plaintext data by the second dictionary compression, the post-process compressed data is generated by executing encoding using the first compression/decompression algorithm.

3. The storage system according to claim 2, wherein in the post-process compression, the encoding is executed by the processor using the first compression/decompression algorithm.

4. The storage system according to claim 2, wherein in the post-process compression, the encoding is executed using the first compression/decompression algorithm by inputting the data compressed by the second dictionary compression to the data compression/decompression circuit.

5. The storage system according to claim 1, wherein the controller starts the post-process compression when an operating rate of the processor is lower than a preset threshold.

6. The storage system according to claim 1, wherein in the post-process compression, the oldest data is selected from among candidate data stored in the one or more storage drives.

7. The storage system according to claim 1, wherein an upper limit of at least one of a number of hash bits and a number of entries in the hash table for the second dictionary compression is larger than that in the hash table for the first dictionary compression.

8. The storage system according to claim 1, wherein the controller executes the post-process compression during garbage collection in the one or more storage drives.

9. The storage system according to claim 2, wherein the controller reads the data compressed by the post-process compression from the one or more storage drives, decompresses the compressed data into the plaintext data by the data compression/decompression circuit, and transmits the decompressed data to the host.

10. The storage system according to claim 1, wherein
the data compression/decompression circuit is implemented as a hardware accelerator having a limited circuit scale, and
the second dictionary compression executed by the processor is configured to have greater character string search capability than that of the data compression/decompression circuit.

11. The storage system according to claim 1, wherein the controller executes the post-process compression when an operating rate of the processor is lower than a preset threshold.

12. A data compression method in a storage system including a processor and a data compression/decompression circuit, the data compression method comprising:
in-line compression of plaintext data from a host and post-process compression of in-line compressed data stored in one or more storage drives,
wherein the in-line compression includes:
generating in-line compressed data by executing a compression process including first dictionary compression on the plaintext data from the host using the data compression/decompression circuit; and
storing the in-line compressed data in the one or more storage drives,
wherein the post-process compression includes:
generating the plaintext data by decompressing the in-line compressed data read from the one or more storage drives using the data compression/decompression circuit; and
generating post-process compressed data by executing a compression process including second dictionary compression on the plaintext data using the processor, the second dictionary compression being more excellent in character string search capability than the first dictionary compression, and storing the post-process compressed data in the one or more storage drives, and wherein a number of characters of a character string in a hash table for the second dictionary compression is smaller than that in a hash table for the first dictionary compression.

13. The data compression method according to claim 12, wherein an upper limit of at least one of a number of hash bits and a number of entries in the hash table for the second dictionary compression is larger than that in the hash table for the first dictionary compression.

14. The data compression method according to claim 12, wherein the data compression/decompression circuit is implemented as a hardware accelerator having a limited circuit scale, and the second dictionary compression executed by the processor is configured to have greater character string search capability than that of the data compression/decompression circuit.

15. The data compression method according to claim 12, wherein the processor executes the post-process compression when an operating rate of the processor is lower than a preset threshold.

* * * * *